United States Patent
Wouters et al.

(10) Patent No.: US 8,847,154 B2
(45) Date of Patent: *Sep. 30, 2014

(54) ION TRANSFER TUBE FOR A MASS SPECTROMETER SYSTEM

(75) Inventors: Eloy R. Wouters, San Jose, CA (US);
Alexander A. Makarov, Bremen (DE);
R. Paul Atherton, San Jose, CA (US);
Jean Jacques Dunyach, San Jose, CA (US)

(73) Assignee: Thermo Finnigan LLC, San Jose, CA (US)

( * ) Notice: Subject to any disclaimer, the term of this patent is extended or adjusted under 35 U.S.C. 154(b) by 124 days.

This patent is subject to a terminal disclaimer.

(21) Appl. No.: 13/333,948

(22) Filed: Dec. 21, 2011

(65) Prior Publication Data

US 2012/0153141 A1 Jun. 21, 2012

Related U.S. Application Data

(63) Continuation-in-part of application No. 12/858,726, filed on Aug. 18, 2010, now Pat. No. 8,309,916.

(51) Int. Cl.
*H01J 49/26* (2006.01)
*H01J 49/42* (2006.01)
*H01J 49/04* (2006.01)

(52) U.S. Cl.
USPC ........... 250/283; 250/288; 250/281; 250/282; 250/287

(58) Field of Classification Search
USPC ........................... 250/288, 281, 282, 283, 287
See application file for complete search history.

(56) References Cited

U.S. PATENT DOCUMENTS

| | | |
|---|---|---|
| 4,542,293 A | 9/1985 | Fenn et al. |
| 4,977,320 A | 12/1990 | Chowdhury et al. |
| 5,736,740 A | 4/1998 | Franzen |
| 5,965,883 A | 10/1999 | Lee et al. |
| 6,107,628 A | 8/2000 | Smith et al. |
| 6,359,275 B1 | 3/2002 | Bertsch et al. |
| 6,455,846 B1 | 9/2002 | Prior et al. |
| 6,486,469 B1 | 11/2002 | Fischer et al. |
| 6,703,611 B2 | 3/2004 | Glish et al. |
| 6,777,672 B1 | 8/2004 | Park |

(Continued)

OTHER PUBLICATIONS

Wu et al., "Incorporation of a Flared Inlet Capillary Tube on a Fourier Transform Ion Cyclotron Resonance Mass Spectrometer," J Am Soc Mass Spectrom 2006, 17, pp. 772-779.

(Continued)

*Primary Examiner* — Nikita Wells
(74) *Attorney, Agent, or Firm* — Thomas F. Cooney

(57) ABSTRACT

An ion transfer tube for a mass spectrometer comprises a core member and a first jacket tube member at least partially enclosing the core member and providing one or more channels therethrough. A method of forming an ion transfer tube, comprises: providing a first jacket tube member having a length and an internal bore, the internal bore passing along the length and defining an interior surface of circular cross section; removing at least one portion of the first jacket tube member adjacent to the interior surface so as to form at least one groove, channel, slot, recess or embayment of or in the interior surface; and providing a core member within the bore of the jacket tube member such that remnant portions of the interior surface of circular cross section mate against portions of an exterior surface of the core member.

38 Claims, 20 Drawing Sheets

(56) References Cited

U.S. PATENT DOCUMENTS

| | | |
|---|---|---|
| 6,943,347 B1 | 9/2005 | Willoughby et al. |
| 7,081,618 B2 | 7/2006 | Laprade |
| 7,081,620 B2 | 7/2006 | Kato |
| 8,158,932 B2 * | 4/2012 | Belford et al. ............. 250/287 |
| 8,309,916 B2 * | 11/2012 | Wouters et al. ............. 250/283 |
| 2002/0096630 A1 | 7/2002 | Russ, IV |
| 2002/0158027 A1 | 10/2002 | Moon et al. |
| 2002/0175281 A1 | 11/2002 | Valaskovic |
| 2002/0185595 A1 | 12/2002 | Smith et al. |
| 2003/0015656 A1 | 1/2003 | Van Berkel |
| 2003/0052269 A1 | 3/2003 | Apffel, Jr. |
| 2003/0111599 A1 | 6/2003 | Staats |
| 2003/0143493 A1 | 7/2003 | Schultz et al. |
| 2003/0168591 A1 | 9/2003 | Smith et al. |
| 2004/0129876 A1 | 7/2004 | Franzen |
| 2004/0227072 A1 | 11/2004 | Park |
| 2004/0245458 A1 | 12/2004 | Sheehan et al. |
| 2005/0054208 A1 | 3/2005 | Fedorov et al. |
| 2005/0072916 A1 | 4/2005 | Park |
| 2005/0109948 A1 | 5/2005 | Park et al. |
| 2005/0269503 A1 | 12/2005 | Sheehan et al. |
| 2006/0076485 A1 | 4/2006 | Stoermer et al. |
| 2006/0103051 A1 | 5/2006 | Staats |
| 2006/0113463 A1 | 6/2006 | Rossier et al. |
| 2006/0186329 A1 | 8/2006 | Gebhardt et al. |
| 2006/0273251 A1 | 12/2006 | Verbeck et al. |
| 2007/0200059 A1 | 8/2007 | Tang et al. |
| 2007/0278399 A1 | 12/2007 | Kim et al. |
| 2008/0073555 A1 | 3/2008 | Dunyach et al. |
| 2008/0116370 A1 | 5/2008 | Splendore et al. |
| 2008/0116371 A1 | 5/2008 | Wouters et al. |
| 2008/0142698 A1 | 6/2008 | Atherton et al. |
| 2008/0197275 A1 | 8/2008 | Mordehai et al. |
| 2008/0296493 A1 | 12/2008 | Willoughby et al. |
| 2008/0308721 A1 | 12/2008 | Senko et al. |
| 2009/0050801 A1 | 2/2009 | Fedorov |
| 2009/0056133 A1 | 3/2009 | Waits et al. |
| 2009/0057551 A1 | 3/2009 | Tang et al. |
| 2009/0212210 A1 | 8/2009 | Finlay et al. |
| 2009/0230296 A1 | 9/2009 | Kelly et al. |
| 2010/0078553 A1 | 4/2010 | Corso et al. |
| 2011/0147576 A1 | 6/2011 | Wouters et al. |
| 2011/0147577 A1 | 6/2011 | Kovtoun et al. |

OTHER PUBLICATIONS

Ibrahim et al., "Improving Mass Spectrometer Sensitivity Using a High-Pressure Electrodynamic Ion Funnel Interface," J Am Soc Mass Spectrom 2006, 17, pp. 1299-1305.

Velasquez-Garcia et al., "A Planar Array of Micro-Fabricated Electrospray Emitters for Thruster Applications," J. Microelectromechanical Systems 15 (5), pp. 1272-1280.

Kelly et al., "Array of Chemically Etched Fused-Silica Emitters for Improving the Sensitivity and Quantitation of Electrospray Ionization Mass Spectrometry," Anal. Chem. 2007, 79, pp. 4192-4198.

* cited by examiner

ION TRANSFER TUBE FOR A MASS SPECTROMETER SYSTEM

CROSS REFERENCE TO RELATED APPLICATION

This application is a Continuation-in-Part of and claims, under 35 U.S.C. 120, the benefit of the filing date of U.S. patent application Ser. No. 12/858,726 filed Aug. 18, 2010, now U.S. Pat. No. 8,309,916, which is assigned to the assignee of the instant application.

FIELD OF THE INVENTION

This invention generally relates to mass spectrometer systems, and more specifically to an ion transfer tube for transporting ions between regions of different pressure in a mass spectrometer.

BACKGROUND OF THE INVENTION

Ion transfer tubes are well-known in the mass spectrometry art for transporting ions from an ionization chamber, which typically operates at or near atmospheric pressure, to a region of reduced pressure. Generally described, an ion transfer tube typically consists of a narrow elongated conduit having an inlet end open to the ionization chamber, and an outlet end open to the reduced-pressure region. Ions formed in the ionization chamber (e.g., via an electrospray ionization (ESI) or atmospheric pressure chemical ionization (APCI) process), together with partially desolvated droplets and background gas, enter the inlet end of the ion transfer tube, traverse its length under the influence of the pressure gradient, and exit the outlet end into a lower-pressure chamber—namely, the first vacuum stage of a mass spectrometer. The ions subsequently may then pass through apertures in one or more partitions, such apertures possibly in skimmer cones, through regions of successively lower pressures so as to be thereafter delivered to a mass analyzer for acquisition of a mass spectrum.

FIG. 1 is a simplified schematic diagram of a general conventional mass spectrometer system 10 comprising an atmospheric pressure ionization (API) source coupled to an analyzing region via an ion transfer tube. Referring to FIG. 1, an API source 12 housed in an ionization chamber 14 is connected to receive a liquid sample from an associated apparatus such as for instance a liquid chromatograph or syringe pump through a capillary 7. The API source 12 optionally is an electrospray ionization (ESI) source, a heated electrospray ionization (H-ESI) source, an atmospheric pressure chemical ionization (APCI) source, an atmospheric pressure matrix assisted laser desorption (MALDI) source, a photoionization source, or a source employing any other ionization technique that operates at pressures substantially above the operating pressure of mass analyzer 28 (e.g., from about 1 Torr to about 2000 Torr). Furthermore, the term API source is intended to include a "multi-mode" source combining a plurality of the above-mentioned source types. The API source 12 forms charged particles 9 (either ions or charged droplets that may be desolvated so as to release ions) representative of the sample, which charged particles are subsequently transported from the API source 12 to the mass analyzer 28 in high-vacuum chamber 26 through at least one intermediate-vacuum chamber 18. In particular, the droplets or ions are entrained in a background gas and transported from the API source 12 through an ion transfer tube 16 that passes through a first partition element or wall 11 into an intermediate-vacuum chamber 18 which is maintained at a lower pressure than the pressure of the ionization chamber 14 but at a higher pressure than the pressure of the high-vacuum chamber 26. The ion transfer tube 16 may be physically coupled to a heating element or block 23 that provides heat to the gas and entrained particles in the ion transfer tube so as to aid in desolvation of charged droplets so as to thereby release free ions.

Due to the differences in pressure between the ionization chamber 14 and the intermediate-vacuum chamber 18 (FIG. 1), gases and entrained ions are caused to flow through ion transfer tube 16 into the intermediate-vacuum chamber 18. A plate or second partition element or wall 15 separates the intermediate-vacuum chamber 18 from either the high-vacuum chamber 26 or possibly a second intermediate-pressure region (not shown), which is maintained at a pressure that is lower than that of chamber 18 but higher than that of high-vacuum chamber 26. Ion optical assembly or ion lens 20 provides an electric field or electric fields that guide and focus the ion stream leaving ion transfer tube 16 through an aperture 22 in the second partition element or wall 15 that may be an aperture of a skimmer 21. A second ion optical assembly or lens 24 may be provided so as to transfer or guide ions to the mass analyzer 28. The ion optical assemblies or lenses 20, 24 may comprise transfer elements, such as, for instance a multipole ion guide, so as to direct the ions through aperture 22 and into the mass analyzer 28. The mass analyzer 28 comprises one or more detectors 30 whose output can be displayed as a mass spectrum. Vacuum port 13 is used for evacuation of the intermediate-vacuum chamber 18 and vacuum port 19 is used for evacuation of the high-vacuum chamber 26.

FIG. 2 is a schematic illustration of a portion, in particular, an outlet portion 50 of a known ion transfer tube. The upper and lower parts of FIG. 2 respectively show a cross-sectional view and a perspective view of the outlet portion 50. The ion transfer tube comprises a tube member 52 (in this example, cylindrical tube) having a hollow cylindrical interior or bore 54, the flow direction through which is indicated by the dashed arrow. At the outlet end 51 of the ion transfer tube, the tube member 52 is terminated by a substantially flat end surface 56 that is substantially perpendicular to the length of the tube and to the flow direction. Further, a beveled surface or chamfer 58, which in the case of the cylindrical tube shown is a frustoconical surface, may be disposed at an angle to the end surface so as to intersect both the end surface 56 and the outer cylindrical surface of the tube member 52. The surface 58 may be used to align and seat the outlet end of the ion transfer tube against a mating structural element (not shown) in the interior of the intermediate vacuum chamber 18 or may be used so as to penetrate, upon insertion into a mass spectrometer instrument, a vacuum sealing element or valve, such as the sealing ball disclosed in U.S. Pat. No. 6,667,474, in the names of Abramson et al.

The number of ions delivered to the mass analyzer (as measured by peak intensities or total ion count) is partially governed by the flow rate through the ion transfer tube. One of the ways to increase the sensitivity of a mass spectrometer is to let in more ion laden-gas from the API source 12, provided that enough vacuum pumping is being applied to maintain a sufficient level of vacuum in the mass spectrometer for it to function. However, this approach of increasing the throughput of the ion transfer tube, either by shortening it or increasing its inner diameter, has been found experimentally to be limited by how well the solvent surrounding the ions can be evaporated during the transfer time of the tube. Thus, the ion transfer tube is generally heated to improve solvent evaporation and ion de-solvation. Unfortunately, the maximum temperature that can be applied to the ion transfer tube is limited due to melting of nearby plastic parts as well as to fragmentation of fragile molecular ions such as certain peptides that may flow through the tube.

Another disadvantage arising from use of the conventional ion transfer tube is the inability of the round-cross-section bore to effectively match—and thus efficiently capture ions from—the charged particle plumes produced by linear or otherwise configured arrays of simultaneously emitting ion sources, i.e. discrete or as part of a monolithically formed microchip assembly. Arrays of multiple ion transfer tubes have been described (for example, Kelly et al., "Capillary-Based Multi Nanoelectrospray Emitters: Improvements in Ion Transmission Efficiency and Implementation with Capillary Reversed-Phase LC-ESI-MS", Anal. Chem. 2008, 80, pp. 143-149) so as to geometrically match the charged particle plumes as well as increase the efficiency of heat transfer to the solvated ions. However, such ion transfer tube arrays are more costly to implement than is a single ion transfer tube and are difficult to align, couple to an ion source and extract and replace for cleaning. Further, an expansion of ion and gas is generally formed at the low-pressure outlet end of an ion transfer tube. If multiple ion transfer tubes are employed in an array, the ions in each of these expansions must be merged back into a single beam of ions (refocused), a process which the inventors have found to be non trivial and to lead to loss of sensitivity, as compared to the novel ion transfer tubes disclosed herein. There are therefore needs in the art for ion transfer tubes which have improved abilities to transfer heat to entrained charged particles and improved efficiency in capturing charged particles from plumes produced by emitter arrays.

SUMMARY

The present disclosure addresses the above-noted needs in the conventional art through the teaching of various ion transfer tubes and associated systems for transferring ions from an atmospheric pressure ion (API) source into the first vacuum stage of a mass spectrometer where the inner diameter of the tube has a non circular cross section.

Various embodiments of ion transfer tubes in accordance with the present teachings comprise a tube member having an inlet end and an outlet end; and at least one bore or channel extending through the tube member from the inlet end to the outlet end, the at least one bore or channel having a non-circular cross section. Embodiments of ion transfer tubes according to the present teachings may have contiguous interior bores or channels with cross sections comprising one or more lobes that are elliptical, obround, or "letterbox" or slot shape, with either square or rounded corners. Various embodiments of ion transfer tubes according to the present teachings may comprise a plurality of mutually non-contiguous bores or channels. Each bore or channel of the plurality may have a cross section comprising one or more lobes that are elliptical, obround, or of a "letterbox" or slot shape, with either square or rounded corners.

Various embodiments of ion transfer tubes according to the present teachings may comprise one or more separated bores or channels of which an internal dimension or a cross-sectional area diminishes or decreases in the direction of flow through the tube, from an inlet end to an outlet end of the tube. Each one of the one or more bores or channels may have a cross section comprising one or more lobes that are elliptical, obround, or of a "letterbox" or slot shape, with either square or rounded corners.

Various embodiments of ion transfer tubes according to the present teachings may comprise a plurality of separated bores or channels which converge towards one another in the direction of flow through the tube. Each of the separated bores or channels may comprise an internal dimension or a cross-sectional area that diminishes or decreases in the direction of flow through the tube. Further, each of the separated bores or channels may have a cross section comprising one or more lobes that are elliptical, obround, or of a "letterbox" or slot shape, with either square or rounded corners.

Various other embodiments according to the present teachings may comprise a tube member having an inlet end and an outlet end; a plurality of first slots extending through the tube member from the inlet end to the outlet end, the first slots being substantially parallel to one another; and at least one second slot intersecting at least two of the plurality of first slots. The intersection is preferably at a high angle, and may be at a right angle.

Various other embodiments of ion transfer tubes according to the present teachings may comprise a core member; and a first jacket tube member at least partially enclosing the core member and providing one or more channels therethrough. Each of the channels may be partially bounded by an inner surface of the first jacket tube member and partially bounded by an exterior surface of the core member. The core member may comprise a channel passing therethrough or, alternatively, may comprise a solid rod. A second jacket tube member at least partially enclosing the first jacket tube member may also be provided. The second jacket tube member, if provided, provides one or more additional channels therethrough. In various embodiments, the channels may converge towards one another in a direction towards an outlet end of the ion transfer tube. The converging channels may merge into a single output channel which may be either within the core member or the jacket tube member. The single output channel may comprise a nozzle structure at its outlet end.

According to various other embodiments, an ion transfer tube for a mass spectrometer comprises: a tube member having an inlet end, an outlet end and a central axis; and a bore extending through the tube member from the inlet end to the outlet end, the bore comprising a plurality of lobes that intersect along the central axis. According to various other embodiments, an ion transfer tube for a mass spectrometer comprises: a tube member having an inlet end, an outlet end and a central axis; and a plurality of slots extending through the tube member from the inlet end to the outlet end, none of the slots intersecting the central axis.

Systems in accordance with the present teachings include ion emitter arrays, having multiple simultaneously emitting individual ion emitters coupled to an ion transfer tube receiving ions from the multiple emitters, the ion transfer tube having a contiguous interior bore or channel with a cross section comprising one or more lobes that are elliptical, obround, or "letterbox" or slot shape, with either square or rounded corners, the cross sectional shape configured so as to maximize either the efficiency of transfer of charged particles from the emitter array into the bore or channel or the transfer of heat to the charged particles within the bore or channel. The bore or channel may have an internal dimension or a cross-sectional area that diminishes or decreases in the direction of flow through the tube.

Various other systems in accordance with the present teachings include ion emitter arrays having multiple simultaneously emitting individual ion emitters coupled to an ion transfer tube receiving ions from the multiple emitters, the ion transfer tube having multiple non-contiguous interior bores or channels, each bore or channel with a cross section comprising one or more lobes that are elliptical, obround, or "letterbox" or slot shape, with either square or rounded corners. Each of the separated bores or channels may be configured so as to receive ions predominantly from a subset of the ion emitters of the array. Each of the separated bores or channels may have an internal dimension or a cross-sectional area that diminishes or decreases in the direction of flow through the tube. Further, the separated bores or channels may converge towards one another in the direction of flow through the tube.

Additionally, various methods of forming an ion transfer tube in accordance with the present teachings comprise the steps of: providing a tube member having a length and an internal bore, the internal bore having a wall of circular cross section; and etching or eroding portions of the tube member adjacent to the wall so as to form an enlarged bore or channel having a non-circular cross section. Various other methods of forming an ion transfer tube may comprise the steps of: providing a first jacket tube member having a first length and an internal bore, the internal bore passing along the length and defining an interior surface of circular cross section; removing at least one portion of the first jacket tube member adjacent to the interior surface so as to form at least one groove, channel, slot, recess or embayment of or in the interior surface; and providing a core member within the bore of the jacket tube member such that remnant portions of the interior surface of circular cross section mate against portions of an exterior surface of the core member. Various methods may include the further steps of providing a second jacket tube member having an internal bore and a second length either the same as or different from the length of the first jacket tube member, the internal bore passing along a length of the second jacket tube member and defining an interior surface of the second jacket tube member of circular cross section; removing at least one portion of the second jacket tube member adjacent to the surface of the second jacket tube member so as to form at least one groove, channel, slot, recess or embayment of or in the interior surface of the second jacket tube member; and providing the core member and the first jacket tube member within the bore of the second jacket tube member such that remnant portions of the interior surface of the second jacket tube member of circular cross section mate against portions of an exterior surface of the first jacket tube member. In some embodiments, the first jacket tube member may have a length slightly greater than a length of the core member (or, equivalently, an outer jacket tube member may have a length slightly greater than the length of an inner jacket tube member) such that the longer jacket tube member extends partially beyond an end of the core member or beyond an end of the inner jacket tube member. Such an arrangement provides the advantages of a counterbored ion transfer tube end as described US patent application publication 2010/0276584 A1, without requiring an additional machining step to form a counterbore.

Various methods for analyzing a sample in accordance with the present teachings comprise the steps of: (a) generating ions from the sample within an ionization chamber at substantially atmospheric pressure; (b) entraining the ions in a background gas; (c) transferring the background gas and entrained ions to an evacuated chamber of a mass spectrometer system using an ion transfer tube having an inlet end, an outlet end, and at least one bore or channel extending through the tube member from the inlet end to the outlet end, the at least one bore or channel having a non-circular cross section; and (d) analyzing the ions using a mass analyzer of the mass spectrometer system. Various other methods for analyzing a sample in accordance with the present teachings comprise the steps of: generating ions from the sample within an ionization chamber at substantially atmospheric pressure; entraining the ions in a background gas; transferring the background gas and entrained ions to an evacuated chamber of a mass spectrometer system using an ion transfer tube comprising a core member and a first jacket tube member at least partially enclosing the core member and providing one or more channels therethrough; and analyzing the ions using a mass analyzer of the mass spectrometer system.

BRIEF DESCRIPTION OF THE DRAWINGS

The above noted and various other aspects of the present invention will become apparent from the following description which is given by way of example only and with reference to the accompanying drawings, not drawn to scale, in which.

DETAILED DESCRIPTION

The following description is presented to enable any person skilled in the art to make and use the invention, and is provided in the context of a particular application and its requirements. Various modifications to the described embodiments will be readily apparent to those skilled in the art and the generic principles herein may be applied to other embodiments. Thus, the present invention is not intended to be limited to the embodiments and examples shown but is to be accorded the widest possible scope in accordance with the features and principles shown and described.

To more particularly describe the features of the present invention, please refer to FIGS. 3 through 22 in conjunction with the discussion below.

Figure 3:
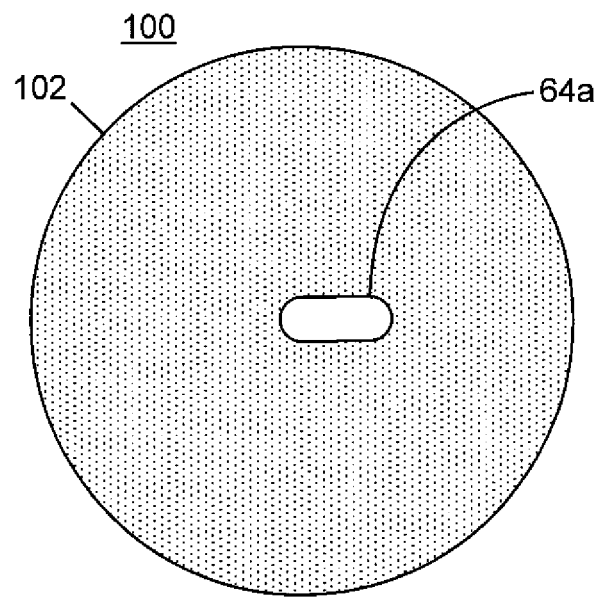
FIG. 3 is a cross sectional view of an ion transfer tube in accordance with various embodiments of the instant teachings.

FIG. 3 is a cross sectional view of a portion of an ion transfer tube, ion transfer tube 100, in accordance with various embodiments of the instant teachings. The internal bore of the ion transfer tube 100 comprises a slot 64a in the tube material 102 that is elongated in one dimension (i.e., a "letterbox" shape) and that has rounded ends so as to form a so-called "obround" shape. Alternatively, the bore could comprise a rectangular slot, but rounded ends are preferred in order to maintain smoothness and symmetry of fluid flow through the bore. As shown in FIG. 3, each rounded end comprises or approximates a semi-circle. The slot 64a (with or without rounded off corners) may be accurately and rapidly formed from a pre-existing standard circular tube bore using, for instance, wire electrical discharge machining (wire-EDM) so as to enlarge or extend the bore in one direction outward from the tube center by removing portions of the tube wall adjacent to the original circular bore. For instance, the wire-EDM procedure may employ an 0.2 mm diameter wire.

Figure 4:
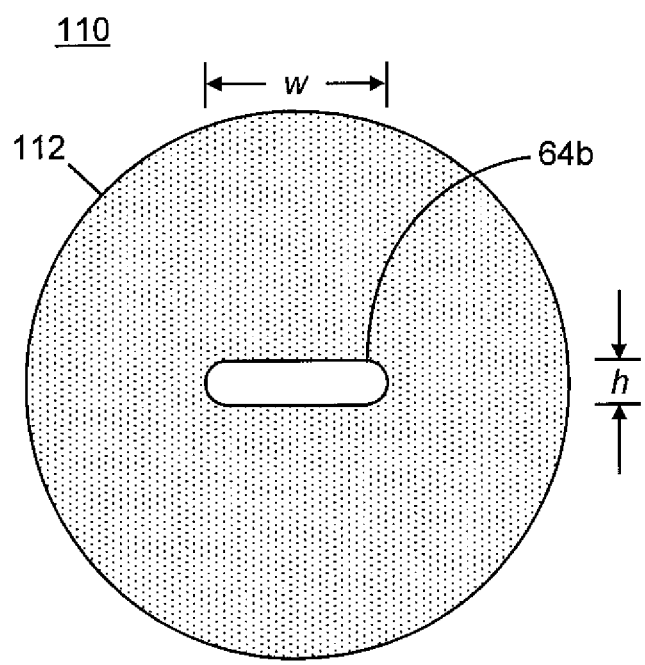
FIG. 4 is a cross sectional view of a second ion transfer tube in accordance with various embodiments of the instant teachings.

FIG. 4 is a cross sectional view of a portion of another ion transfer tube, ion transfer tube 110, in accordance with various embodiments of the instant teachings. In this example, the slot 64b in the tube material 112 has been formed (for example, by wire-EDM, wire erosion, etching or abrasion) in diametrically outward directions, from an originally circular cross section bore of 580 μm diameter so as to create a "letterbox" like shape—with rounded corners—having a width, w (along the elongated direction), of 1.25 mm and a height, h, of 580 μm. A slot of this size conveniently fits within the 1/16" outer diameter of commonly available stock tubing. The slot 64b may be considered as comprising a number, N, of lobes extending outwardly from the tube axis, wherein N=2. By contrast, the slot 64a (FIG. 3) may be considered as being associated with N=1. The ratio, R, between the area of the novel slotted bore 64b and the standard circular bore is $$R = \frac{\pi(580/2)^2 + (1250-580) \times 580}{\pi(580/2)^2} = 2.47x. \quad \text{Eq. 1}$$

The steady state chamber pressure of an evacuated chamber into which gas is introduced through an ion transfer tube may be taken as a measure of the throughput of the tube. Accordingly, the respective throughputs of three different ion transfer tubes used as inlets to a chamber were compared by observing the chamber pressures obtained with a two-stage mechanical pump having a pumping capacity of 30 m³/hr, and operated in a choked flow regime (all tubes the same length). The results are shown in Table 1 below. From the results shown in Table 1, it may be observed that, as expected, the chamber pressure scales in direct proportion to the bore cross-sectional area for the two tubes having circular bores. Moreover, with regard to the present discussion, it is also to be noted that, within experimental error, the ratio of pressures observed in comparison of the slotted-bore tube having bore lobe height of 580 μm to the circular-bore tube having 580 μm also scales in direct proportion to the area ratio as calculated in Eq. 1 above. To achieve throughput comparable to that of the obround-bore

TABLE 1

Comparison of ion transfer tube throughput

| BORE TYPE | DIMENSION(S) | CHAMBER PRESSURE |
|---|---|---|
| Circular | 580 μm diameter | 2.7 Torr |
| Circular | 700 μm diameter | 3.9 Torr |
| Obround | 1250 μm × 580 μm | 6.5 Torr | tube, a circular-bore tube having a bore diameter of 911 μm would be required. Some charged droplets passing through the center of such a conventional single bore tube would be as far as 455 μm away from a heat-providing tube wall as compared to the maximum distance of 290 μm experienced by droplets passing through the tube with the obround bore. The obround-bore tube is therefore expected to provide more complete desolvation than a circular-bore tube of similar length having the same bore cross-sectional area. Equivalently, the obround-bore tube is expected to, in general, provide greater throughput than and equivalent desolvation to a circular-bore tube having a diameter equal to the minimum distance across (i.e., the height of, in the present example) the obround channel.

The benefit of a so-called "letterbox" shape is that the one of the dimensions of the rectangular cross section can be kept relatively small, i.e. similar to the maximum useable diameter in case of a tube with circular inner bore so to maintain sufficient desolvation, whereas the other dimension (i.e., the width) can be much larger so as to increase the throughput of ion laden gas from the API source and thereby increasing the sensitivity of the mass spectrometer system.

Alternatively, the cross sectional area can be maintained approximately the same as that of the maximum usable diameter, which at e.g. 1.25 mm width would correspond to a channel height in the 220-260 μm range. This reduced height would have, as a benefit, the property that the desolvation properties of such a tube would be improved over a circular bore capillary without affecting the throughput. The improved desolvation would increase the sensitivity of the mass spectrometer system, and also would allow the tube to be operated at lower temperatures which could benefit the transmission of fragile, temperature sensitive molecules, e.g. certain (poly-)peptides.

Figure 5:
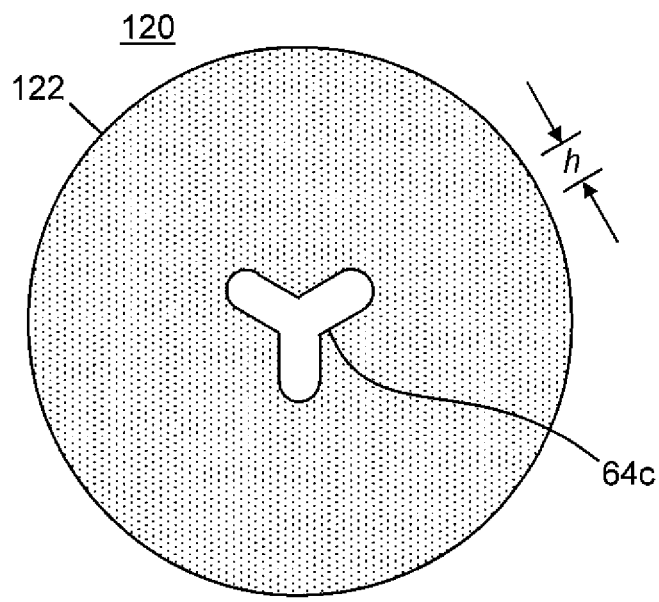
FIG. 5 is a cross sectional view of a third ion transfer tube in accordance with various embodiments of the instant teachings.
Figure 6:
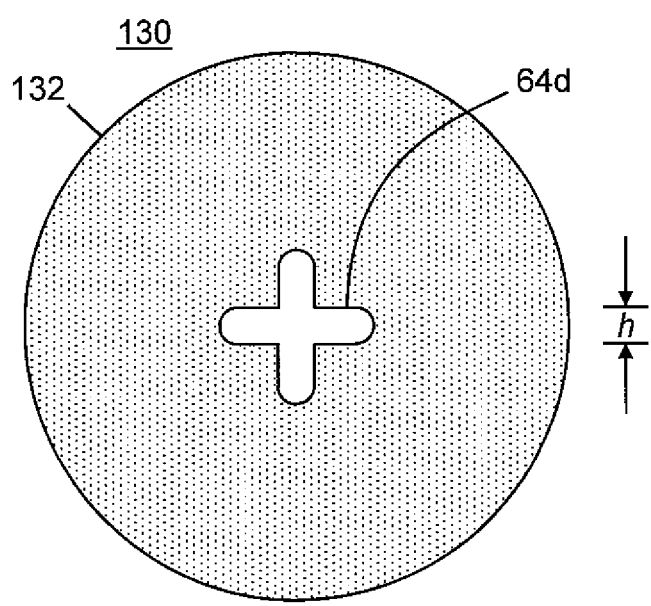
FIG. 6 is a cross sectional view of a fourth ion transfer tube in accordance with various embodiments of the instant teachings.

FIG. 5 is a cross sectional view of a portion of a third ion transfer tube, ion transfer tube 120, and FIG. 6 is a cross sectional view of a fourth ion transfer tube, ion transfer tube 130, in accordance with various alternative embodiments of the instant teachings. The ion transfer tube 120 comprises a bore 64c in tube material 122 having three lobes (that is, N=3) and the ion transfer tube 130 comprises a bore 64d in tube material 132 having four lobes (that is, N=4) all extending outward from the central axis of the respective ion transfer tube. The multiple lobes of these tube bores may be employed so as to match the configuration of emitters in an emitter array—for instance, an array comprising three emitters in the case of ion transfer tube 120 or an array configured in a cross geometry, in the case of ion transfer tube 130. Alternatively, these multi-lobed ion transfer tubes may be employed advantageously even with linear emitter arrays since the presence of multiple lobes may mitigate the effect of any angular misalignment of the tube, taken with regard to rotation about its long axis.

As described previously, the various lobes may be formed by wire-EDM erosion (or other erosion or abrasion technique) outward from a pre-existing central hole or bore of circular cross-section. The lobe height, h, of each lobe only needs to be as large as the diameter of the wire or tool used to form it.

Figure 7:
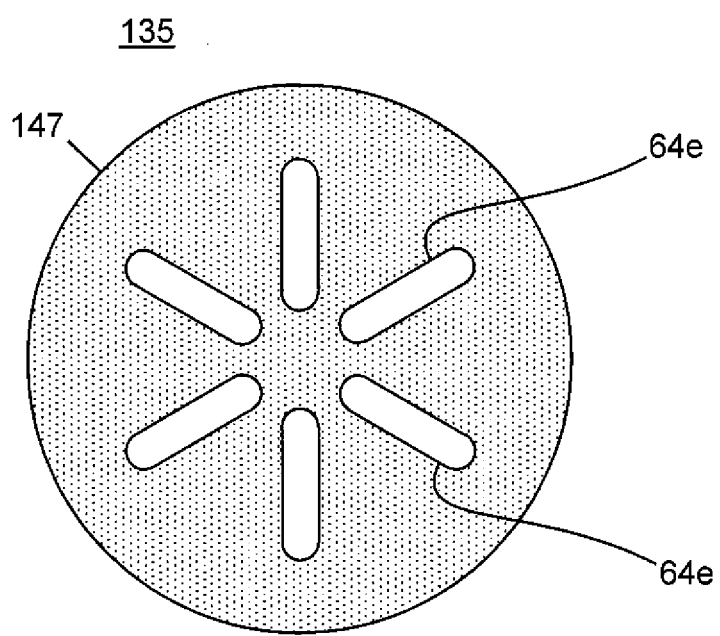
FIG. 7 is a cross sectional view of a fifth ion transfer tube in accordance with various embodiments of the instant teachings.

FIG. 7 is a cross sectional view of a fifth ion transfer tube in accordance with various embodiments of the instant teachings. The ion transfer tube 135 illustrated in FIG. 7 comprises a plurality of bores 64e disposed within the tube material 147 around the center of the tube material but does not comprise any central bore (that is, a bore disposed at a central axis of the ion transfer tube) nor any other point of intersection of the various individual bores 64e. Although the bores 64e are illustrated as six radially oriented slots in FIG. 7, the bores can be of any general shape or orientation and may be of any number. Further, the bores need not be symmetrically disposed about the center of the tube material 147. The configuration of slots shown in FIG. 7 leads to more complete surrounding of all portions of the flow of charged particles and gas by the heat conducting tube material 147 than if the slots were to intersect in the center of the tube. The configuration shown in thus lends itself to more efficient heat transfer and desolvation than those embodiments having a central bore.

Figure 8:
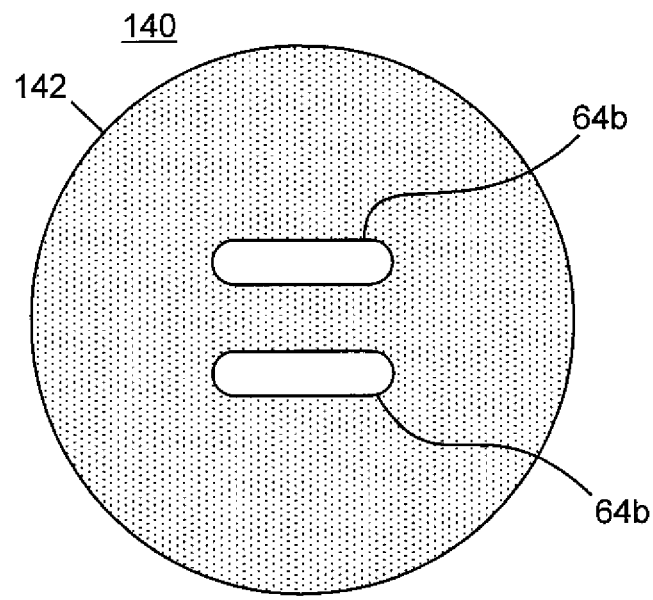
FIG. 8 is a cross sectional view of a sixth ion transfer tube in accordance with various embodiments of the instant teachings.
Figure 9:
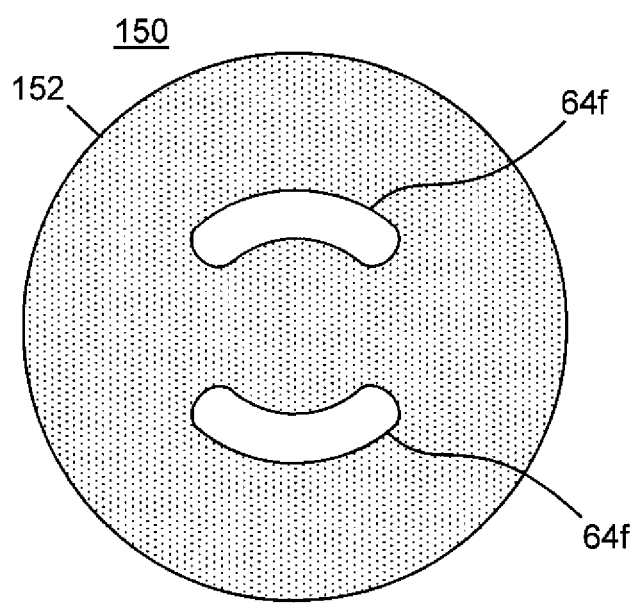
FIG. 9 is a cross sectional view of a seventh ion transfer tube in accordance with various embodiments of the instant teachings.

FIG. 8 and FIG. 9 are cross sectional views of a sixth ion transfer tube and a seventh ion transfer tube, respectively, in accordance with various embodiments of the instant teachings. The ion transfer tube 140 illustrated in FIG. 8 comprises multiple distinct separated obround bores 64b in tube material 142 and the ion transfer tube 150 illustrated in FIG. 9 comprises multiple arcuate bores 64f in tube material 152. Although two such bores are illustrated in each of FIG. 8 and FIG. 9, the number of bores within a particular ion transfer tube need not be limited to any particular number. These multiple-bore ion tubes (for example, those shown in FIGS. 7-9) may be employed to capture charged particles emitted by a single two-dimensional emitter array. The multiple-bore ion tubes may also capture charged particles emitted by separate emitter arrays—for example, two linear emitter arrays or two curved arrays of emitters—perhaps receiving sample material from respective separate sample sources. As another example, different bores could be used concurrently in order to transport different respective analytes or substances (e.g., one obround bore may be used mainly for analyte, while a different one is used for an internal calibrant). The ion transfer tube 150 (FIG. 9) could alternatively be utilized so as to capture charged particles from a single array of emitters configured as a ring. The use of such a ring-shaped emitter array in conjunction with an ion transfer tube having one or more arcuate bores may be employed advantageously so as to mitigate the effect of any angular rotation of the ion transfer tube about its long axis, such as upon insertion of the thread on the backside of the tube's front nipple in the mating thread of a bulkhead.

Figure 10:
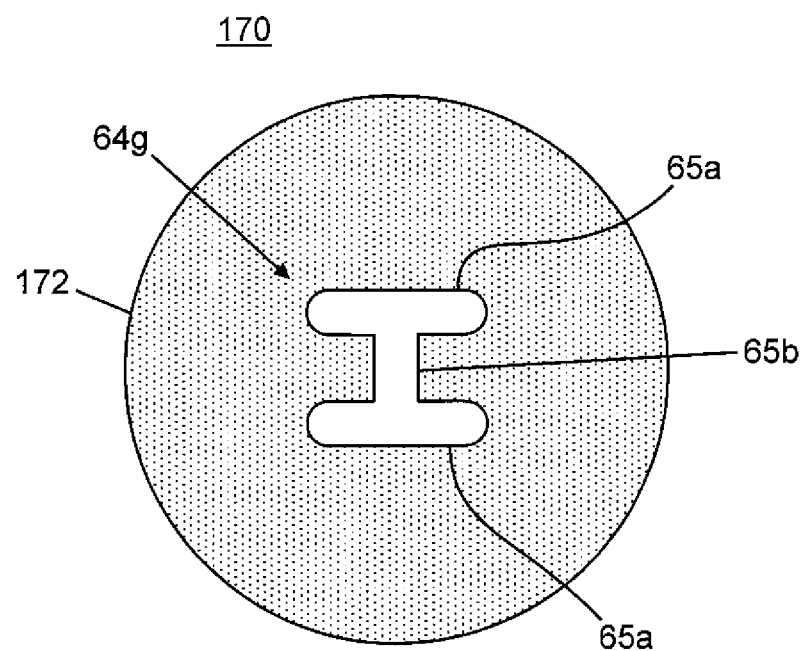
FIG. 10 is a cross sectional view of an eighth ion transfer tube in accordance with various embodiments of the instant teachings.

FIG. 10 is a cross sectional view of an eighth ion transfer tube in accordance with various embodiments of the instant teachings. The ion transfer tube 170 (FIG. 9) has a complexly-shaped bore 64g in tube material 172. The bore 64g comprises two or more substantially parallel slots 65a that are intersected at a high angle, such as a right angle, by another slot 65b. The slot 65b could be extended further than shown in FIG. 9 so as to completely cross one or more of the slots 65a.

The multiple tube bores illustrated in FIGS. 8-10 may be formed by wire-EDM erosion (or other erosion or abrasion technique) outward from separate pre-existing through-going circular bores of a pre-existing tube. For instance, the pre-existing tube may be a commercially available tube having multiple circular bores. If a suitable pre-existing multi-bore tube is not commercially available, then one may be fabricated by drilling multiple bore holes through a solid cylinder.

Figure 11A:
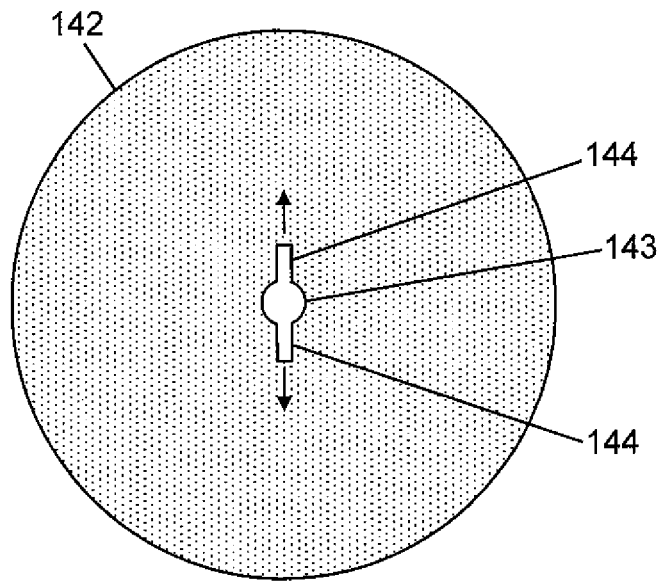
FIGS. 11A and 11B are illustrations of steps in a method for forming a multiple bore ion transfer tube in accordance with the present teachings.
Figure 11B:
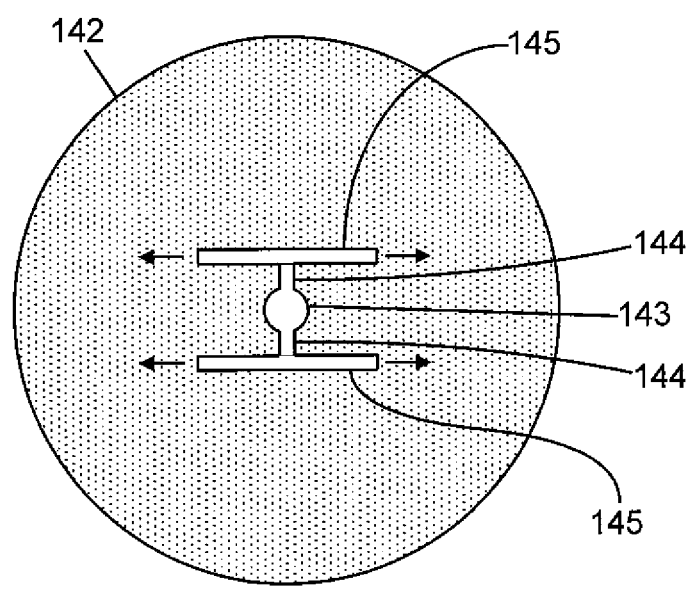

Alternatively, a tube in accordance with the present teachings, such as the ion transfer tube 140 shown in FIG. 8, the ion transfer tube 150 shown in FIG. 9 or the ion transfer tube 170 shown in FIG. 10, may be fabricated starting with a conventional tube having a single central bore, as illustrated in FIGS. 11A-11B. A first step, as shown in FIG. 11A, is to etch or erode (e.g., by the wire-EDM technique) auxiliary channels 144 outward from a pre-existing central circular bore hole 143 within a tube 142, as indicated by the arrows in FIG. 11A. The ends of the auxiliary channels 144 then serve as starting points for etching or erosion of additional channels 145, as shown by the arrows in FIG. 11B. Further enlargement (if desired) of the channels 145 then yields the slots 64b as shown in FIG. 8. The auxiliary channels 144 could be formed in some other directions than those shown.

Figure 12A:
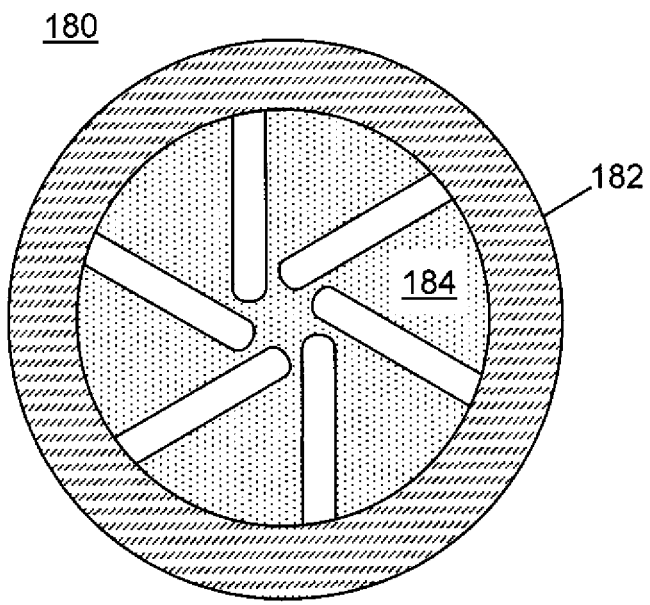
FIG. 12A is a cross-sectional view of a ninth ion transfer tube in accordance with various embodiments of the instant teachings.
Figure 12B:
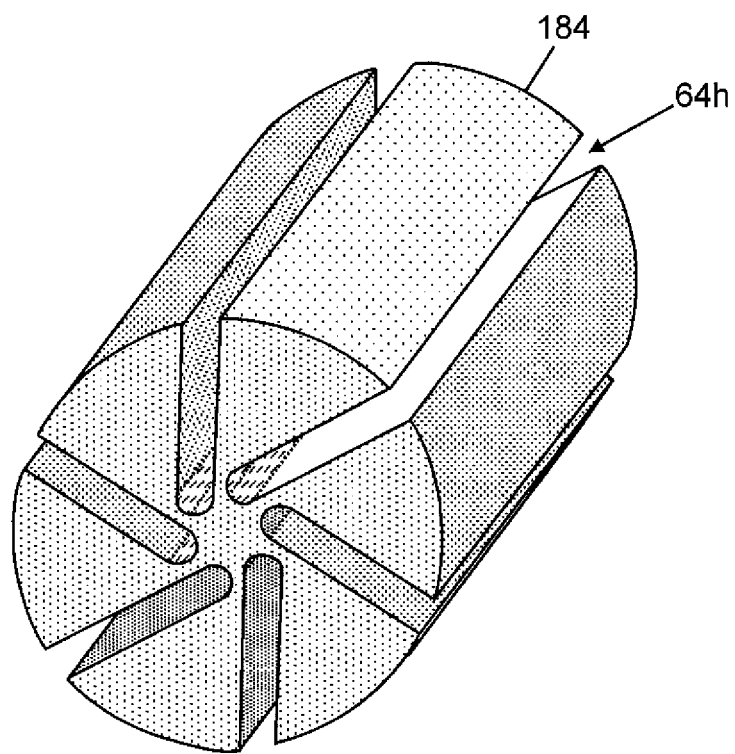
FIG. 12B is a perspective view of a core portion of the ion transfer tube of FIG. 12A.

FIGS. 12A-12B illustrate a ninth ion transfer tube in accordance with various embodiments of the instant teachings. FIG. 12A, which provides a cross-sectional view of the ion transfer tube 180, illustrates that this ion transfer tube comprises an inner channeled cylindrical core tube member 184 that is surrounded by an outer jacket tube member 182 circumferentially surrounding the core tube member. FIG. 12B shows, in perspective view, just the core tube member 184.

The slots or channels 64h through which, in operation, gas and charged particles pass are formed solely within the core tube member 184. These channels 64h may be formed within the core tube member 184, prior to its insertion into the jacket tube member 182, by wire EDM (or other etching, erosion or cutting technique) that commences at the outer surface of the core tube member and progresses inward into the core tube member. Because the erosion etching or cutting commences at the outer surface of the core tube member, multiple channels are slots may be formed without the need to provide multiple axial "starter" bores or holes within the interior of the tube. Once the channels 64h have been fully formed within the core tube member 184, the ion transfer tube 180 may be assembled in its final form by inserting the core tube member 184 into the hollow interior of the jacket tube member 182. Together, the channels 64h and the enclosing jacket tube 182 confine the flow of gas and charged particles through the ion transfer tube 180. Such two-piece construction allows a user to replace the core tube member by another one—perhaps comprising a different channel pattern—as required by the user.

Although the channels 64h may be formed according to any desired pattern, it is advantageous for the channels to be formed according to a pattern, such as the one shown in FIG. 12, that permits the core tube member 184 to exert a spring force against the inner surface of the jacket tube member 182 upon insertion and during use, thus ensuring a snug, gas-tight fit. To enable such a spring force, the core tube member 184 should be fabricated with an outer diameter that is slightly greater than the inner diameter of the jacket tube member 182. Then, with an appropriate channel pattern, such as the one shown in FIG. 12, the thin wall portions of the core tube member 184 the reside between the side of one channel and the base of an adjacent channel 64h may flex upon insertion into the jacket tube member 182 such that the core tube member forms a compression dowel within the jacket tube member. The channel pattern illustrated in FIG. 12 may be described as comprising a plurality of channels, each of which penetrates the interior of the core tube member 184 from the outer cylindrical surface of the core tube member 184 without residing or lying along a radius of the tube. As shown, these channels are geometrically related by rotational symmetry about the tube axis.

Figure 13A:
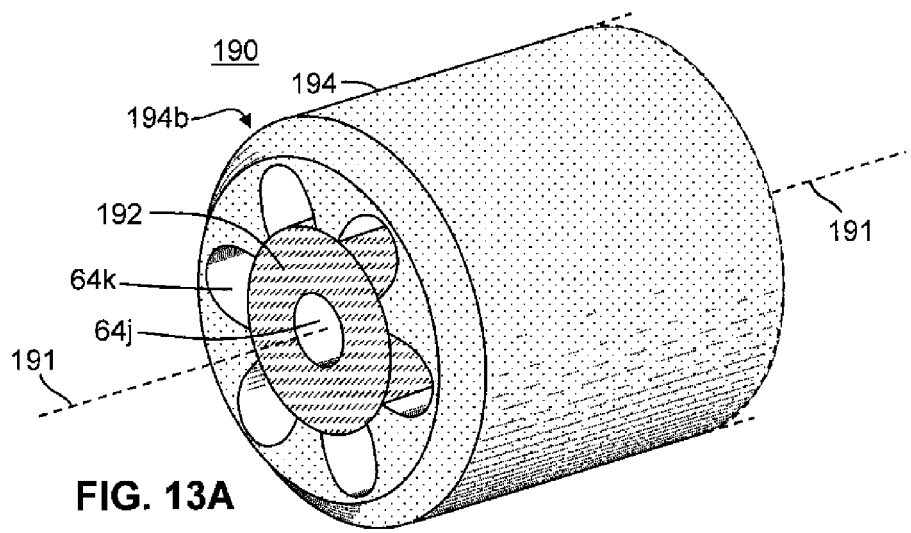
FIG. 13A is a perspective view of a tenth ion transfer tube in accordance with various embodiments of the instant teachings.
Figure 13B:
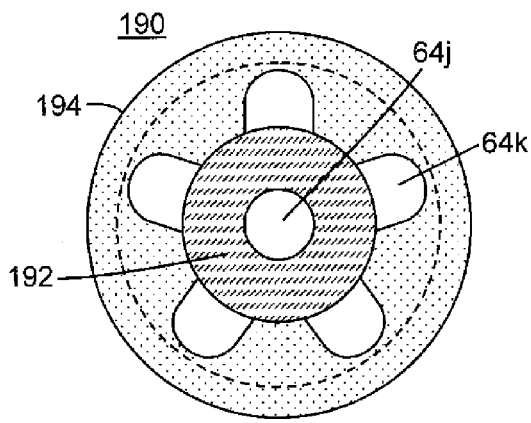
FIG. 13B is a cross sectional view of the ion transfer tube of FIG. 13A.

FIGS. 13A-13B illustrate a tenth ion transfer tube in accordance with various embodiments of the instant teachings. FIG. 13A shows the ion transfer tube in perspective view and FIG. 13B shows the same tube in cross-sectional view The ion transfer tube 190 shown in these figures comprises an inner cylindrical core member 192 that is surrounded by an outer jacket tube member 194 circumferentially surrounding the core member. The inner core member 192 may comprise at least one interior channel, bore or lumen 64j that may be circular in cross section and through which, in operation, gas and charged particles pass. Thus, the core member 192 may comprise a solid rod or may comprise a tube. One or more additional channels 64k are provided between the inner core member 192 and the outer jacket tube member 194 and provide additional pathways through which, in operation, gas and charged particles pass.

The length of the jacket tube member 194 may either the same as or different from the length of the core member 192. In some situations it may be advantageous to form the jacket tube member with a length slightly greater than a length of the core member such that a hollow end of the jacket tube member extends partially beyond an end of the core member. In operation, the end having the partially protruding jacket tube member portion is used as an outlet end of the ion transfer tube. Generally, at the opposite end of the ion transfer tube, the ends of the jacket tube member and core member will be disposed flush with one another. Such an arrangement provides the advantages of a counterbored ion transfer tube end as described US patent application publication 2010/0276584 A1, but without requiring an additional machining step to form a counterbore.

Figure 13C:
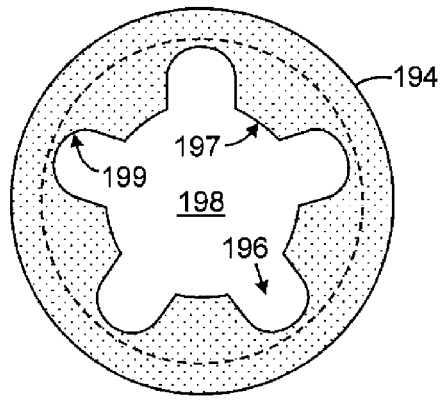
FIG. 13C is a cross sectional view of a component of the ion transfer tube of FIG. 13A.

FIG. 13C illustrates a cross-sectional view of just the outer jacket tube member 194 absent the core member. The outer jacket tube member 194 includes an interior void 198 that is bounded by an interior surface comprising surface portions 197 and 199. Comparison between FIG. 13B and FIG. 13C shows that the channels 64k may be partially formed from grooves, channels, slots or other recesses or embayments 196 of or in the interior surface of the outer jacket tube member 194. Surface portions 199 partially bound the grooves, channels, slots or other recesses or embayments 196 that comprise portions of the void 198. Surface portions 197 are disposed between surface sections 199 and comprise segments of a cylindrical surface. In operation, the inner core member 192 is disposed within the outer jacket tube member 194 such that the surface portions 197 mate with an outer surface of the inner core member 192 so as to form a gas-tight seal between surface portions 197 and the outer surface of the inner core member. Accordingly, in the example shown in FIG. 13, the channels 64k are partially bounded by interior surface portions 197 of the outer jacket tube member 194 and are further partially bounded by an exterior surface of the inner core member 192.

Figure 13D:
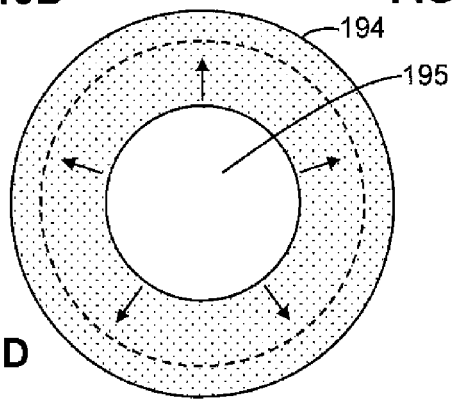
FIG. 13D is a cross sectional view of a component of the ion transfer tube of FIG. 13A, schematically illustrating steps according to one method of manufacture of the ion transfer tube.

The grooves, channels, slots or other recesses or embayments 196 that comprise portions of the void 198 may be formed within the outer jacket tube member 194, prior to insertion of the inner core member 192, by first providing a cylindrical bore or lumen 195 within the outer jacket tube member 194, and then creating the void portions 196 by wire EDM (or other etching, erosion or cutting or machining technique) as indicated by the arrows in FIG. 13D. The surface portions 197 are then remnants of the surface of the bore or lumen 195.

Figure 1:
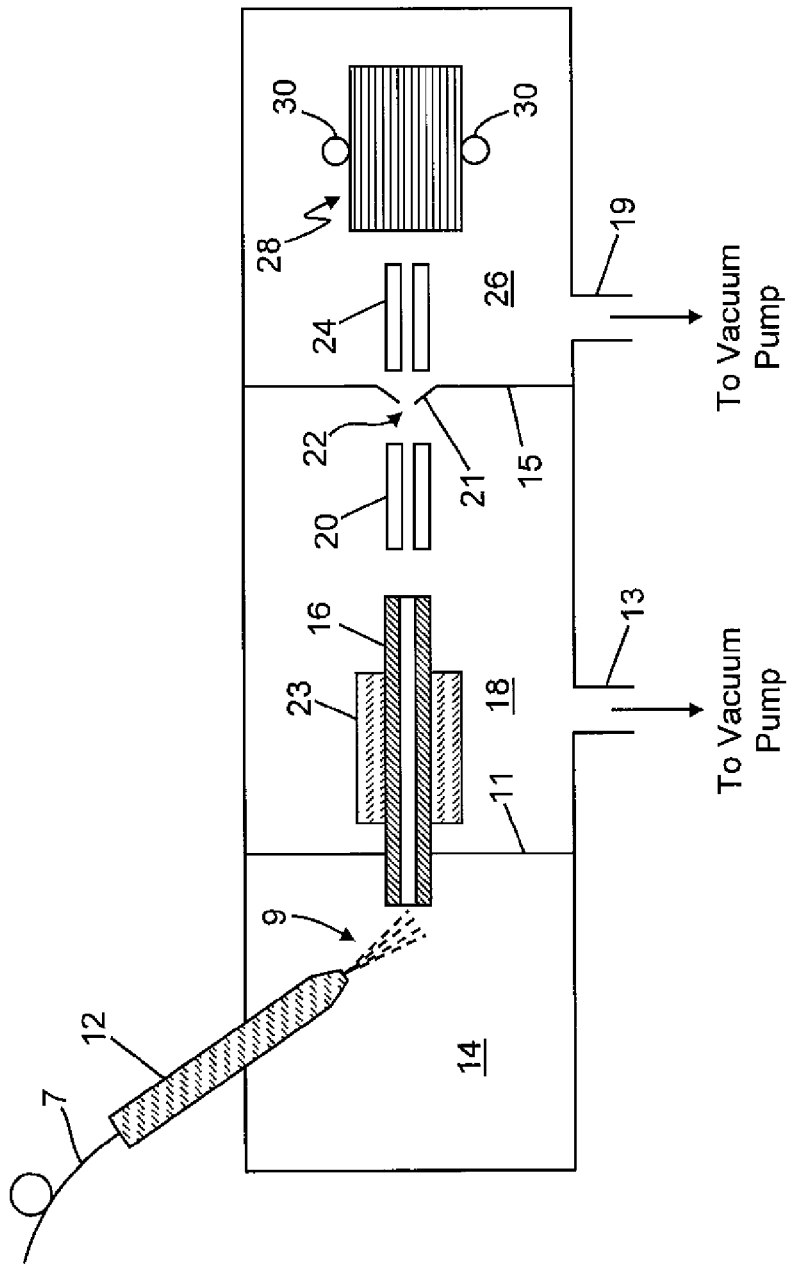
FIG. 1 is a schematic illustration of a generalized mass spectrometer system comprising a conventional ion transfer tube.
Figure 2:
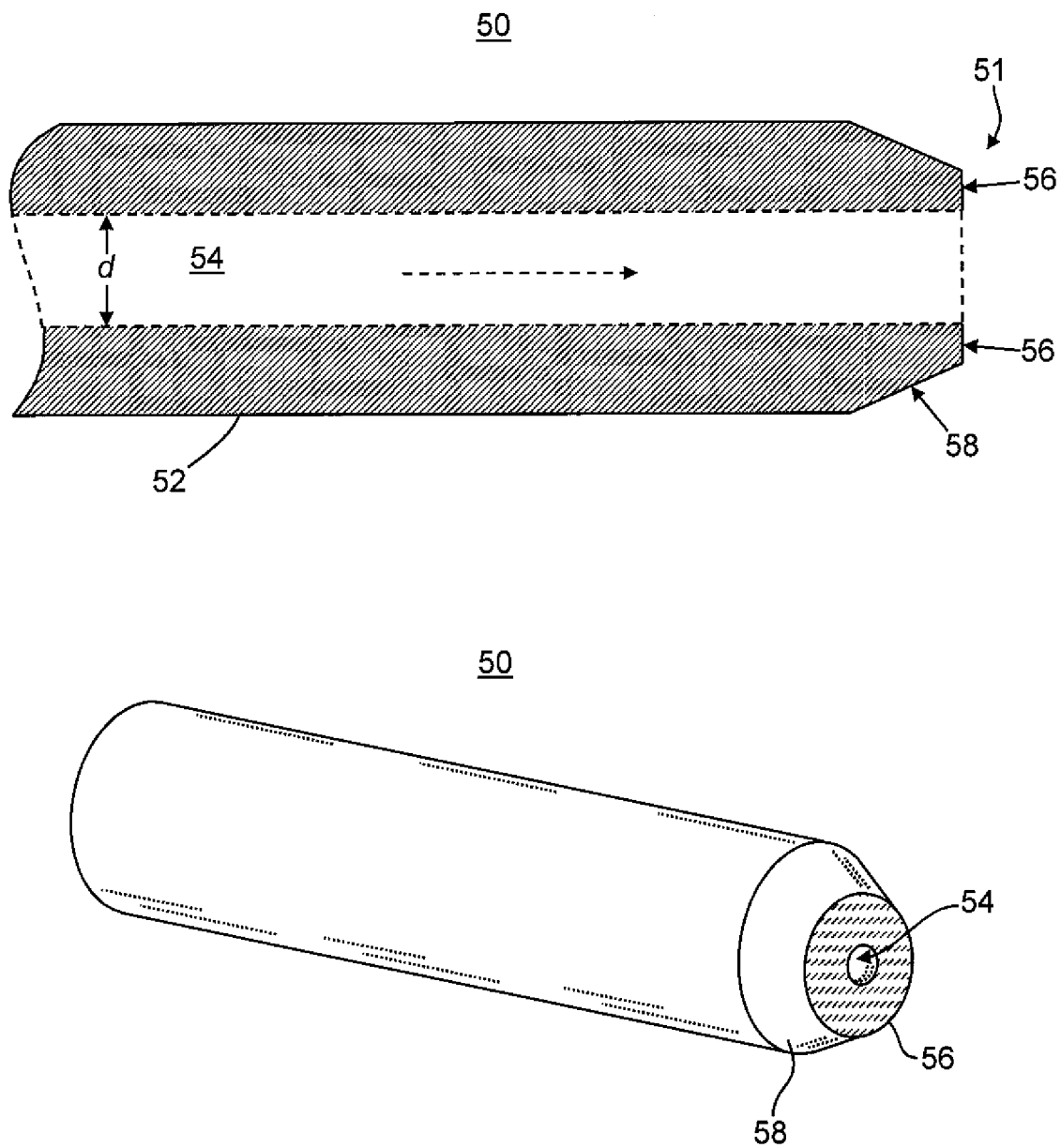
FIG. 2 is a schematic illustration of a portion of a known ion transfer tube in both cross-sectional and perspective views.

Once the void portions 196 have been fully formed within the outer jacket tube member 194, the ion transfer tube 190 may be assembled in its final form by inserting the inner core member 192 into the void 198. The channels 64k then reside between the surface portions 199 of the outer jacket tube member 194 and the outer cylindrical surface of the inner core member 192. During the fabrication of the bore or lumen 195, it may be desirable, as is known in the art, to provide the diameter of the bore or lumen slightly smaller than the outer diameter of the inner core member 192 so that a gas-tight seal may be created in the event that the core member is subsequently pressed, under force, into the void 198 of the outer jacket tube member 194. Optionally, a beveled surface or chamfer 194b may be provided on the outer jacket tube member 194 so as to perform a similar function to the beveled surface or chamfer 58 illustrated in FIGS. 1-2.

In operation of the ion transfer tube 190, a flow of gas and charged particles from an ion plume will occur through both the channel 64j and the plurality of channels 64k. Although alternative configurations are possible, in general, both the channel 64j and the channels 64k will be substantially parallel to a tube axis 191, with the channel 64j being substantially centrally located within the ion transfer tube—that is, along the axis 191. The provision of a central channel 64j enables sampling of a central portion of an ion plume generated from an ion source. The peripheral channels 64k will provide ion samples which are more representative of peripheral portions of the ion plume. In alternative configurations, the central channel 64j may be eliminated, for instance, when the core member comprises a solid rod. In various other alternative configurations, the channels may comprise any cross-sectional shape, such as, for example, the cross-sectional shapes illustrated in FIGS. 3-10. In various other alternative configurations, the peripheral channels 64k may be disposed wholly within the outer jacket tube member 194 as would be the case if a set of bores are drilled through the outer jacket tube member in a fashion so as to surround but not intersect the central bore or lumen 195.

The construction illustrated in FIGS. 13A-13C provides an advantage, relative to conventional ion transfer tubes, of enabling rapid and easy cleaning of the plurality of peripheral channels 64k. In order to perform such cleaning, it is only necessary to remove the core 192 from the outer jacket tube member 194 so as to open all of the channels 64k at once and then apply an abrasive or other cleaning material to the exposed surface portions 199 (FIG. 13C) and to the outer surface of the core member 192. Additionally, one or more special coatings could be applied to the surface portions 199 and to the outer surface of the core member 192 prior to insertion of the core member into the outer jacket tube member. The coating or coatings (e.g., non-sticky coatings or reactive coatings) could be chosen so as to facilitate the cleaning of accumulated contaminants within the channels 64k upon removal of the core member. Such coatings could be applied prior to initial assembly of the ion transfer tube 190 or prior to re-assembly after a cleaning operation.

In still further alternative configurations, one or more additional jacket tube members (not shown) may surround the jacket tube member 194 or one another in the same fashion that the illustrated outer jacket tube member 194 surrounds the inner core member 192. In such configurations, various sets of channels are provided at respective radial distances from the central axis 191. Each such set of channels may comprise one or more channels. The resulting multi-piece construction allows flexible sampling of different portions of an ion plume by replacing either the core member or various ones of the jacket tube members by a respective replacement piece that does not provide a certain set of channels. The length of a second, outer jacket tube member may either the same as or different from the length of a first, inner jacket tube member and the length of the core member. As described above, it may be advantageous to form the second jacket tube member with a length slightly greater than a length of the first jacket tube member such that a portion of the second jacket tube member extends slightly beyond an end of the first jacket tube member. In operation, the end having the partially protruding portion of the second jacket tube member is used as an outlet end of the ion transfer tube. Generally, at the opposite end of the ion transfer tube, the ends of the first and second jacket tube members will be disposed flush with one another.

Figure 13E:
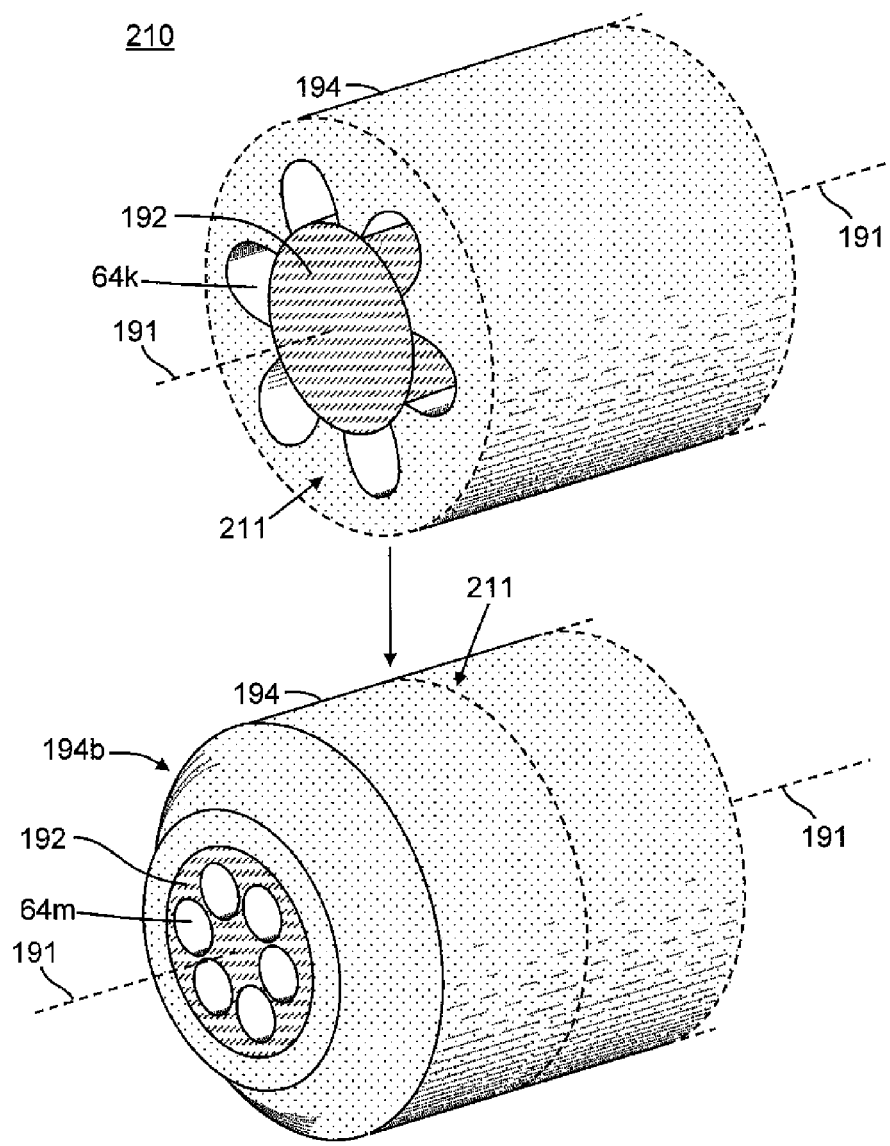
FIG. 13E is a perspective view of an eleventh ion transfer tube in accordance with various embodiments of the instant teachings.
Figure 13F:
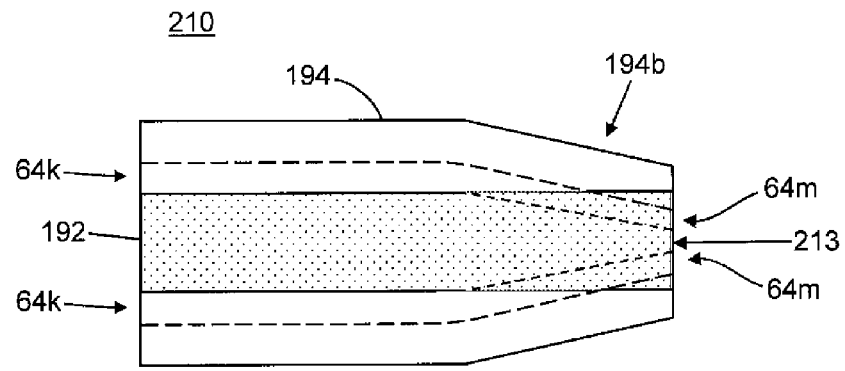
FIG. 13F is a cross sectional view of the ion transfer tube of FIG. 13A along an axis of the ion transfer tube.

FIGS. 13E-13F illustrate an eleventh ion transfer tube in accordance with various embodiments of the instant teachings. FIG. 13E shows two views of the ion transfer tube 210. The bottom view of FIG. 13E shows an end portion of the ion transfer tube. The top view of FIG. 13E shows the same ion transfer tube with a portion of the tube cut away along a plane 211 that is perpendicular to the tube axis 191. FIG. 13F shows the same ion transfer tube 210 in cross-sectional view in a plane along the axis. Like the ion transfer tube 190 illustrated in FIGS. 13A-13B, the ion transfer tube 210 comprises an inner cylindrical core member 192 that is surrounded by an outer jacket tube member 194 circumferentially surrounding the core member such that one or more bores, lumens or channels 64k are provided between the inner core member 192 and the outer jacket tube member 194. In the example shown, the inner core member 192 is solid by may comprise at least one interior channel.

Unlike the ion transfer tube 190 illustrated in FIGS. 13A-13B, the channels of the ion transfer tube 210, through which gas and charged particles may pass do not remain parallel throughout their entire length. Instead, along a portion of the tube length (or along the entirety of the tube length), the channels converge towards the axis 191 and towards one another along the direction of flow of gas and charged particles within the tube. Further, at least one inner dimension of each channel may decrease in the direction of flow. The convergence of the channels assists in focusing the flow of ions so as to improve the efficiency of introduction of such ions into downstream ion optical elements. This focusing effect may be used to advantage to increase the efficiency of overall ion transmission to a mass analyzer, thereby improving instrument sensitivity. In the ion transfer tube 210, this convergence is accomplished by directing the flow of each channel 64k into a respective mating bore, lumen or channel 64m within the inner core member 192 as illustrated in FIG. 13F. The outlet end of each of the channels 64m is at an end face 213 of the inner core member 192 but the inlet end of each of these channels is through the outer cylindrical circumference of the inner core tube member so as to receive the flow from the respective mating channel 64k.

In the example shown in FIGS. 13E-13F, the output at the outlet end of the ion transfer tube 210 occurs from the set of converging channels 64m of the inner core member 192. Alternatively, as described previously, the jacket tube member 194 may extend slightly beyond the outlet end of the core member 192 such that a length of a central hollow portion (a central bore, channel or lumen) of the jacket tube carries the combined merged flow from all of the channels 64m. The inner diameter of this central channel should be designed so as to not introduce a too large discrepancy in the combined total flow rate in order to minimize any disruptions of the flow before, at, or after the merging into the central channel. The central channel of the protruding jacket tube member could have a counter-bore or an asymmetric hourglass constriction as in a de Laval nozzle. FIG. 1311 illustrates an ion transfer tube with such a nozzle constriction 213. The merging point can occur several tens of inner diameters upstream the exit point so that any turbulence caused the by the merging of separate flows subsides and a laminar flow regime is established.

Figure 13G:
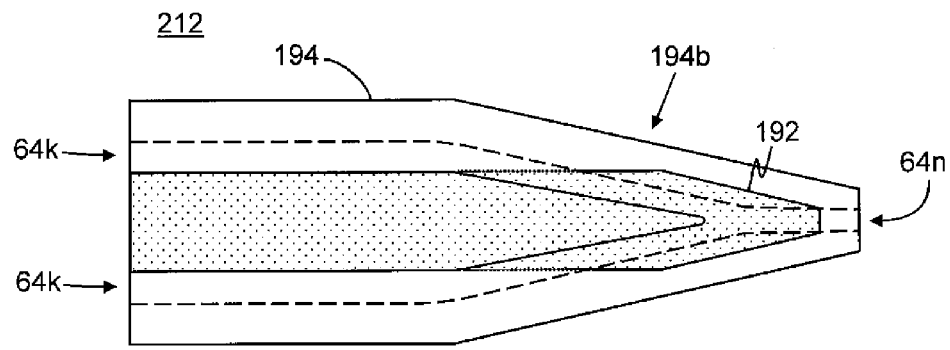
FIG. 13G is a cross sectional view, along a tube axis, of a twelfth ion transfer tube in accordance with various embodiments of the instant teachings.
Figure 13H:
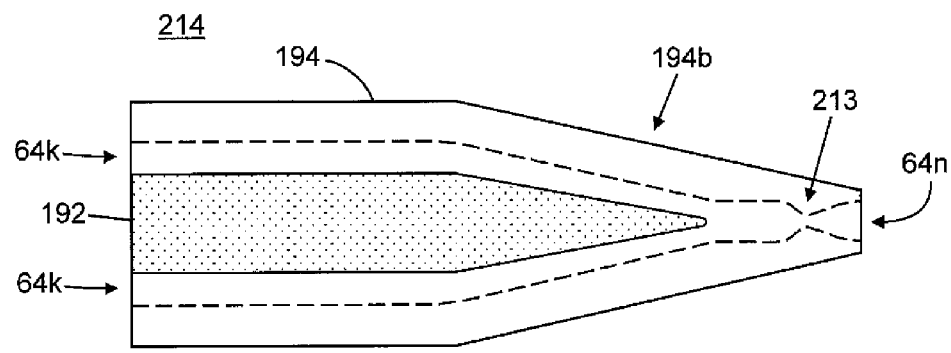
FIG. 13H is a cross sectional view, along a tube axis, of a thirteenth ion transfer tube in accordance with various embodiments of the instant teachings.

The merging of separate flows into a common output channel could, in one example, be accomplished by simple extending the end of the outer jacket tube member 194 shown in FIG. 13F beyond the end of the inner core member 192. FIGS. 13G-13H show two alternative ion transfer tube embodiments in which the flow merging is accomplished by different means. In the ion transfer tube 212 illustrated in cross sectional view in FIG. 13G, the merging is accomplished within the inner core member 192. In the ion transfer tube 214 illustrated in cross sectional view in FIG. 13H, the convergence and merging is accomplished without directing the flow into channels of the inner core member 192. The converging channels 64k near the outlet end of the ion transfer tube 214 conform to and follow a conical end surface of the inner core member 192 so that the flow carried thereby merges into central output channel 64n that is wholly within a protruding end of the jacket tube member 194.

One of ordinary skill in the art could envisage many variations, including hybrid variations, of the channel converging and merging configurations illustrated in FIG. 13. One of ordinary skill in the art could also envision modifications to the ion transfer tube 180 (FIG. 12) so as to cause convergence and ultimate merging of the separate flows carried within the slots 64h. For instance, the cylindrical core tube member 184 of the ion transfer tube 180 could be formed with an outlet end having a conical shape that narrows toward the outlet end of the tube (similar to the shape of core member 192 in FIG. 13H). The inner surface of the outer jacket tube member 182 could then follow and conform to the conical outer surface of the core tube member. The width of the slots 64h could also decrease toward the outlet end thereby converging the flows carried within the slots. All such variations are considered to be within the scope of the present invention.

Figure 14A:
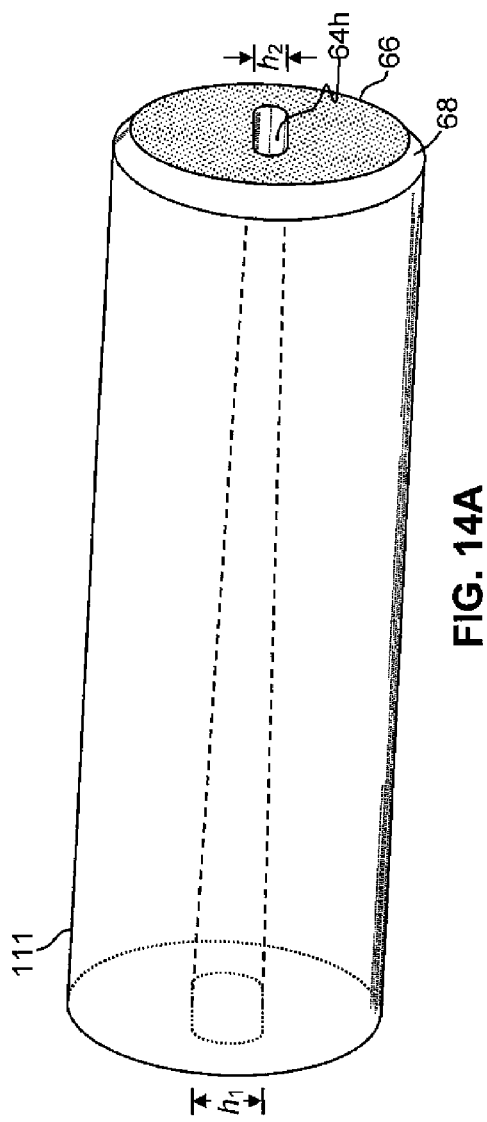
FIG. 14A is a perspective view of a another ion transfer tube in accordance with various embodiments of the instant teachings.
Figure 14B:
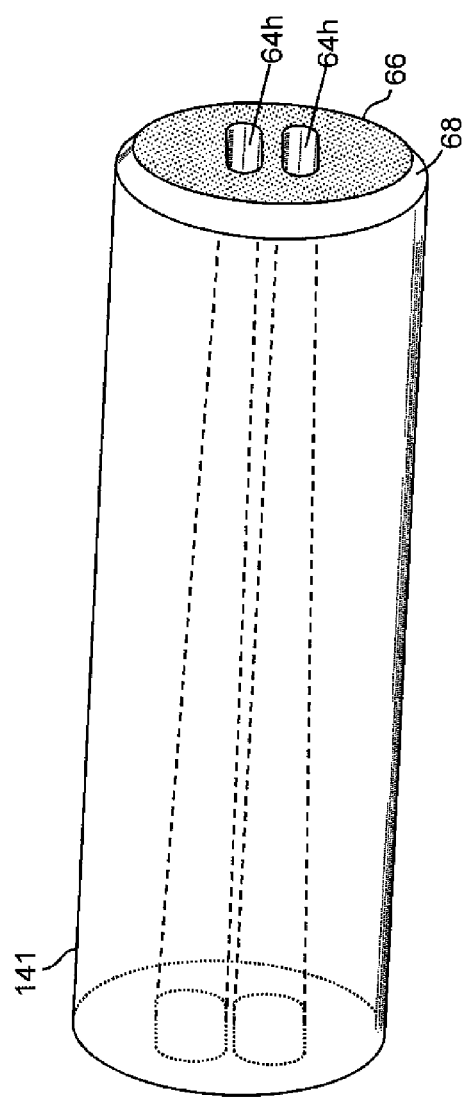
FIG. 14B is a perspective view of yet another ion transfer tube in accordance with various embodiments of the instant teachings.

FIGS. 14A-14B illustrate additional ion transfer tubes having one or more bores having at least one inner dimension that decreases in the direction of flow of charged particles through the tube. As a result, the cross-sectional area of the bore decreases in the same direction. The ion transfer tube 111 shown in FIG. 14A comprises a single bore 64h (comprising two lobes, N=2, as defined above and discussed with regard to the ion transfer tube 110 shown in FIG. 4) whose bore height, decreases from $h_1$ to $h_2$ in the flow direction from left to right. Alternatively, the width of the bore could decrease or both the height and width could decrease. The ion transfer tube 141 illustrated in FIG. 14B comprises two such bores 64h having decreasing cross-sectional area in the direction of flow. As ions or other charged particles together with entrained sheath gas travel along the bore, the average flow velocity increases as the bore cross sectional area decreases and, consequently, the flow regime tends to become laminar flow. The high ion velocity and laminar flow regime downstream tends to minimize any potential adverse effects of increasing ion space charge, tube wall charging (in the case of dielectric materials) or ion discharging against the walls (in the case of electrically conductive wall materials).

Additionally, the centers of the bores may converge towards one another as is also shown in FIG. 14B. The converging walls of each bore or converging bore centers in the direction of flow assist in focusing the flow of ions so as to improve the efficiency of introduction of such ions into downstream ion optical elements. This focusing effect may be used to advantage to increase the efficiency of overall ion transmission to a mass analyzer, thereby improving instrument sensitivity.

Figure 15:
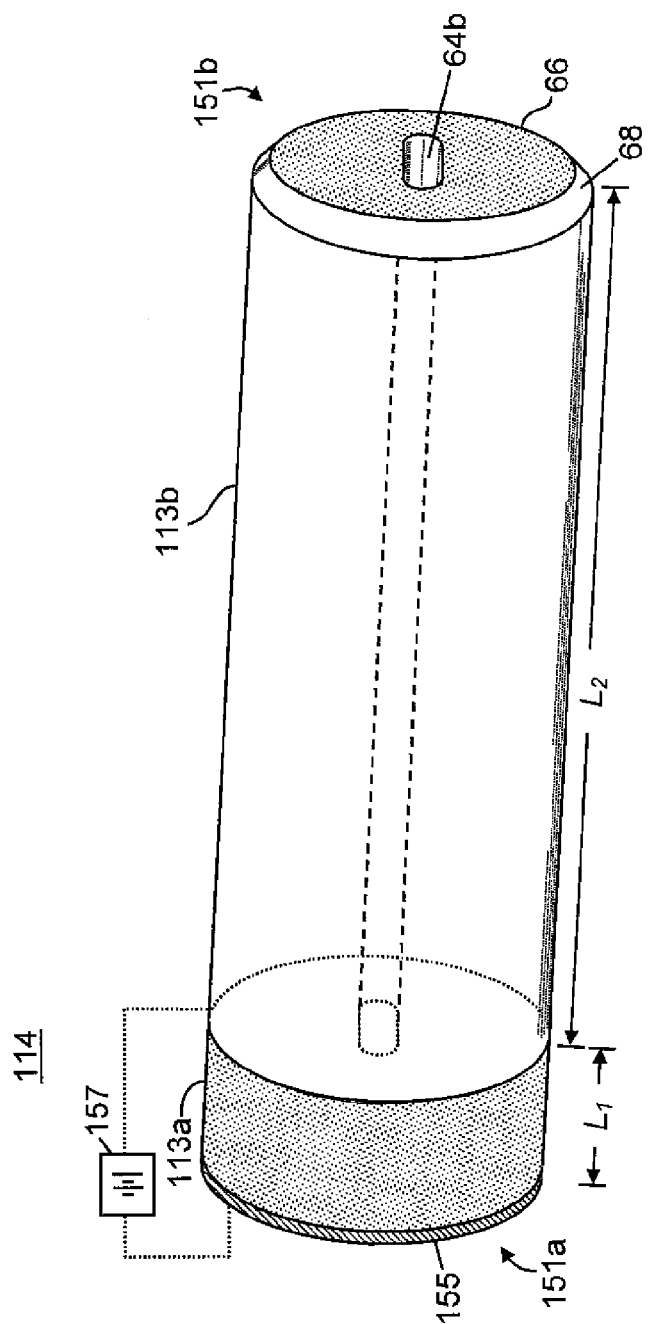
FIG. 15 is a perspective view of still yet another ion transfer tube in accordance with the present teachings.

FIG. 15 is a perspective view of still yet another ion transfer tube, ion transfer tube 114, in accordance with the present teachings. In contrast to the previously illustrated ion transfer tubes, the ion transfer tube 114 depicted in FIG. 15 comprises two separate structural members—a first tube member 113a formed of an electrically resistive material and a second tube member 113b formed of a material, such as a metal, that is an electrical conductor and that also has high thermal conductivity. The two tube members 113a, 113b are joined to one another by a leak-tight seal between the two tube members. Each of the tube members 113a, 113b has a bore. The two bores mate with one another—that is, comprise similar shapes and dimensions—at the juncture of the two tube members. The ion transfer tube 114 shown in FIG. 15 is a modified version of an ion transfer tube disclosed in co-pending U.S. patent application Ser. No. 12/765,540 titled "Ion Transfer Tube for a Mass Spectrometer Having a Resistive Tube Member and a Conductive Tube Member", which was filed on Apr. 22, 2010 and is assigned to the assignee of the present invention. The disclosure of said co-pending application is hereby incorporated herein by reference in its entirety.

The flow within the ion transfer tube 114 is in the direction from the first tube member 113a to the second tube member 113b. Thus, the first tube member 113a and second tube member 113b are respectively disposed at the ion inlet end 151a and the ion outlet end 151b of the ion transfer tube 114. The distance from the open ion inlet of the ion transfer tube 114 to the contact between the first and second tube members 113a, 113b is represented as a length $L_1$ which is greater than or equal to a flow transition length. The flow transition length is the distance within which the through-going flow of carrier gas changes from an initial plug flow or turbulent flow to laminar flow. The second tube member 113b has a length $L_2$.

The resistive tube member 113a may be formed of any one of a number of materials (e.g., without limitation, doped glasses, cermets, polymers, etc.) having electrically resistive properties. It has been postulated (see Verbeck et al., US Patent Application Publication 2006/0273251) that the use of a tube comprising a resistive material enables the bleeding off of any surface charge that would otherwise accumulate on an electrically insulating tube as a result of ion impingement on the tube surface. An electrode 155, which may be a plate, a foil, or a thin film coating, is in electrical contact with an end of the first tube member. A power supply 157 whose leads are electrically connected to the electrode 155 and to the second tube member 113b is operable so as to provide an electrical potential difference between the electrode 155 and to the second tube member 113b. Alternatively, the end of the first tube member 113a that faces the second tube member 113b may be provided with an electrode plate or film, such as a metalized coating together with a tab in electrical contact with the metalized coating. In such an instance, an electrical lead of the power supply 157 may be contacted to the tab, electrode plate or film, instead of directly to the second tube member.

As noted above, the length $L_1$ of the first tube member 113a should be at least as great as the distance required for the carrier gas flow to transition from an initial plug flow or turbulent flow to laminar flow. Within this flow-transition region, collisions of ions or other charged particles with the lumen wall are minimized by the axial electric field provided by the electrical potential difference between the electrode 155 and the second tube member 113b. Since the first tube member 113a is not an electrical insulator, those charged particles which may collide with the lumen wall do not cause surface charging of the first tube member and, thus, there is no opposing electrical field at the inlet end of the ion transfer tube 114 inhibiting the flow of charged particles into the tube. Once the ions or other charged particles have passed into the second tube member 113b, the laminar gas flow prevents further collisions with the lumen wall and, thus, a resistive tube material is no longer required. Instead, it is desirable to form the second tube member 113b of a sufficient length of a material with high thermal conductivity (such as a metal) such that ions are completely de-solvated by heat while traversing the second tube member 113b. This length required for desolvation, which may be on the order of several centimeters, may comprise a significant percentage of the space available for the ion transfer tube 114. Therefore, it may be desirable to limit the length $L_1$ of the first tube member 113a. The inventors have determined that adequate results are obtained when the length of the first tube member 113a (which may be substantially equal to $L_1$) is approximately 5 mm.

Figure 16:
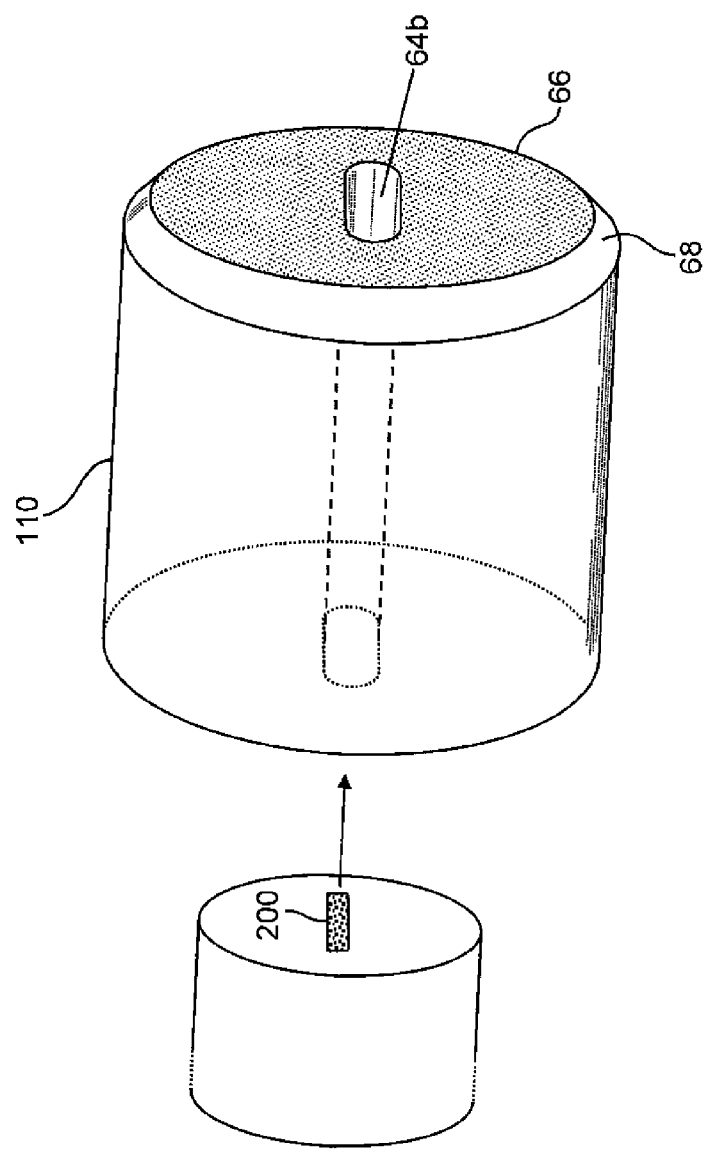
FIG. 16 is an example, in perspective view, of an ion transfer tube in accordance with the instant teachings fluidically coupled to and receiving charged particles from an ion emitter array.

The use of an ion transfer tube with a bore that has an elongated cross section or multiple elongated lobes has the additional benefit (in addition to improved ion capture and desolvation) that it is a key element into implementing another technique that increases the sensitivity of a mass spectrometer: using arrays of electrospray emitters. Since the number of ions emitted by an array is increased with respect to that emitted by a single emitter, but the number of ions that can occupy the volume immediately in front of a conventional ion transfer tube is limited by Coulombic repulsion (the so-called space charge limit), the benefit of multiple emitters cannot be realized with a conventional ion transfer tube. FIG. 16 graphically illustrates this concept with reference to, for example, the ion transfer tube 110 for which a cross sectional view has already been provided in FIG. 4. The elongate bore 64b may align with the long dimension of a linear array 200 of ion emitters, thereby decreasing space charge density at the tube entrance and geometrically providing a better match to the composite ion plume, both in comparison to a conventional ion transfer tube.

Figure 17:
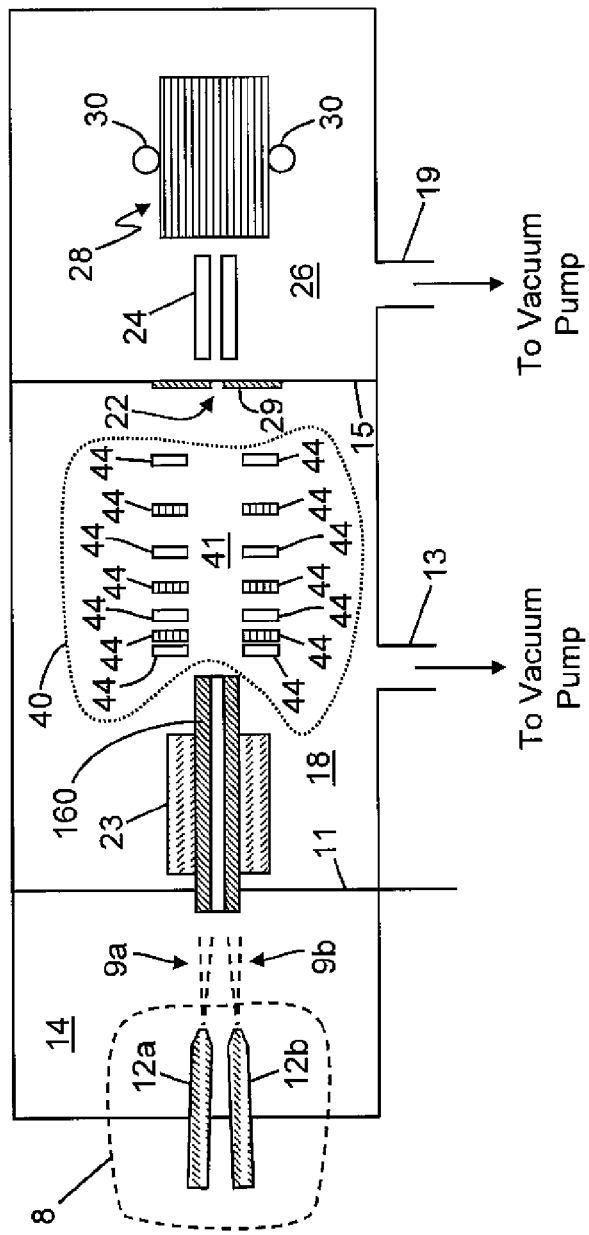
FIG. 17 is a schematic illustration of a mass spectrometer system in accordance with the instant teachings comprising an ion transfer tube in accordance with the instant teachings fluidically coupled to and receiving charged particles from an ion emitter array and delivering ions to a stacked ring ion guide or S-lens system.

FIG. 17 is a schematic illustration of a mass spectrometer system 250 in accordance with the instant teachings. The system 250 comprises both an ion emitter array as well as a novel ion transfer tube as disclosed herein. In contrast to the mass spectrometer system 10 (FIG. 1) that has only a single emitter 12, the system 250 shown in FIG. 17 comprises an emitter array 8 of which two individual emitters 12a, 12b are shown, each producing a respective charged particle stream 9a, 9b, respectively. In general, the emitter array 8 may comprise any suitable number of emitters in any suitable configuration. The mass spectrometer system 250 further comprises, in place of the conventional ion transfer tube 16 (FIG. 1), an ion transfer tube 160 in accordance with the present teachings. The ion transfer tube 160 is fluidically coupled to and receives charged particles from the ion emitter array 8. A heater 23 may provide heat to the ion transfer tube so as to evaporate solvent and de-solvate ions flowing through the tube.

The ion transfer tube 160 shown in FIG. 17 may comprise any of the ion transfer tubes 100 (FIG. 3), 110 (FIG. 4), 120 (FIG. 5), 130 (FIG. 6), 135 (FIG. 7), 140 (FIG. 8) 150 (FIG. 9), 170 (FIG. 10), 180 (FIG. 12A), 190 (FIG. 13A), 210 (FIG. 13E), 212 (FIG. 13G), 214 (FIG. 13H), 111 (FIG. 14A), 141 (FIG. 14B) or 114 (FIG. 15). However, the form of the ion transfer tube 160 need not be limited to one of these listed exemplary embodiments. More generally, the ion transfer tube 160 may include any of the novel features taught herein, either singly or in combination or in combination with other features.

Additionally, the mass spectrometer system 250 may comprise an ion transport device 40 that receives ions from the ion transfer tube 160 within the intermediate vacuum chamber 18, as shown in FIG. 17. The ion transport device may be described as a (square) transfer quadrupole or a stacked ring ion guide (SRIG), types of the latter including the so-called "ion funnel" and the type with progressive spacing also known as an "S-Lens". In operation, the ions exit the outlet end of ion transfer tube 160 as a free jet expansion and travel through an ion channel 41 defined within the interior of the ion transport device 40. As discussed in further detail in US Patent Publication 2009/0045062 A1, the entire disclosure of which is incorporated herein by reference, radial confinement and focusing of ions within ion channel 41 are achieved by application of oscillatory voltages to apertured electrodes 44 of ion transport device 40. Such focusing may be used advantageously to supplement the ion focusing provided by, for example, the ion transfer tube 210 (FIG. 13E), 111 (FIG. 14A) or the ion transfer tube 141 (FIG. 14B) or, in general, other ion transfer tubes having similar features. As is further discussed in US Patent Publication 2009/0045062 A1, transport of ions along ion channel 41 to the device exit may be facilitated by generating a longitudinal DC field. Ions leave the ion transport device 40 as a narrowly focused beam and are directed through aperture 22 of extraction lens 29 into chamber 26.

The reader is referred to US Patent Publication 2009/0045062 A1 for more details of the ion transport device 40 (FIG. 17). Briefly, the ion transport device 40 is formed from a plurality of generally planar electrodes 44 arranged in longitudinally spaced-apart relation (as used herein, the term "longitudinally" denotes the axis defined by the overall movement of ions along ion channel 41). Each electrode 44 is adapted with an aperture through which ions may pass. The apertures collectively define an ion channel 41, which may be straight or curved, depending on the lateral alignment of the apertures. To improve manufacturability and reduce cost, all of the electrodes 44 may have identically sized apertures. An oscillatory (e.g., radio-frequency) voltage source applies oscillatory voltages to electrodes 44 to thereby generate a field that radially confines ions within ion channel 41. In order to create a tapered field that focuses ions to a narrow beam near the exit of the ion transport device 40, the inter-electrode spacing or the oscillatory voltage amplitude may be increased in the direction of ion travel.

The electrodes 44 of the ion transport device 40 may be divided into a plurality of first electrodes interleaved with a plurality of second electrodes, with the first electrodes receiving an oscillatory voltage that is opposite in phase with respect to the oscillatory voltage applied to the second electrodes. Further, a longitudinal DC field may be created within the ion channel 41 by providing a DC voltage source (not illustrated) that applies a set of DC voltages to electrodes 44 in order to assist in propelling ions through the ion transport device 40.

The ion transfer tube 160 of the system 250 (FIG. 17) may be employed in conjunction with and so as to receive ions from a variety ion emitter array configurations and a variety of ion emitter types. The ion transfer tube 160 may be employed in conjunction with an emitter array or may be employed in conjunction with a single ion emitter of either conventional or novel design.

Figure 18:
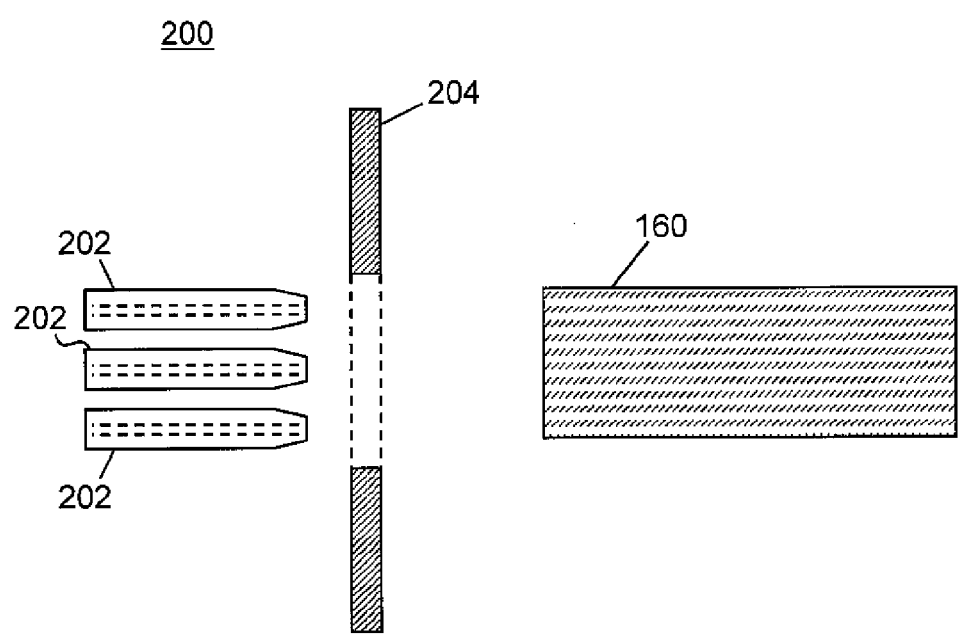
FIG. 18 is a schematic illustration of an array of ion emitter capillaries fluidically coupled to an ion transfer tube in accordance with the present teachings.

As one example, FIG. 18 illustrates an array of conventional ion emitter capillaries 202 fluidically coupled to an ion transfer tube 160 in accordance with the present teachings. The emitter capillaries may be configured so as to produce ions by either the electrospray or atmospheric pressure chemical ionization techniques. As is known, an extractor or counter electrode 204 may be disposed between the plurality of ion emitter capillaries and the ion transfer tube so as to provide an electrical potential difference that assists in accelerating charged particles towards the ion transfer tube 160.

Figure 20:
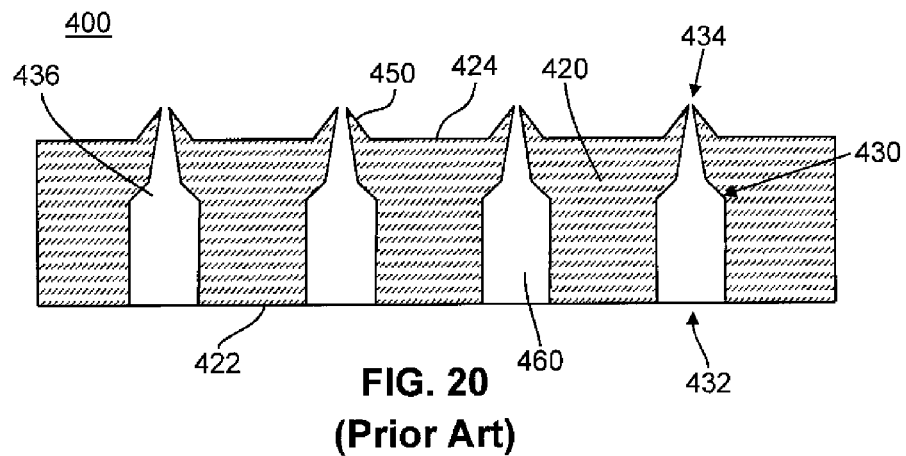
FIG. 20 is a cross-sectional view of another known nano-electrospray emitter array apparatus that may be fluidically coupled to an ion transfer tube in accordance with the present teachings.
Figure 21:
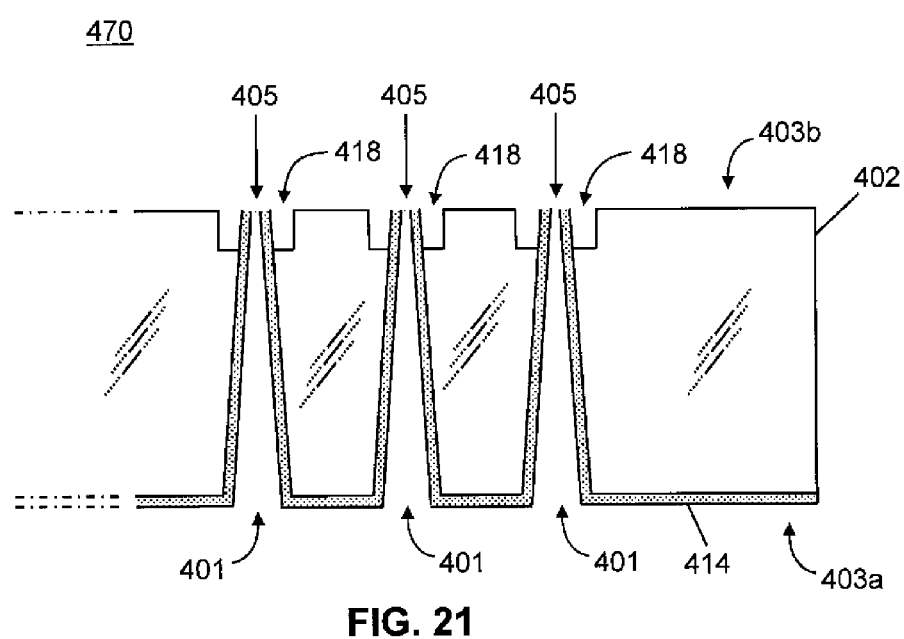
FIG. 21 is a cross-sectional view of another nano-electrospray emitter array apparatus that may be fluidically coupled to an ion transfer tube in accordance with the present teachings.
Figure 22A:
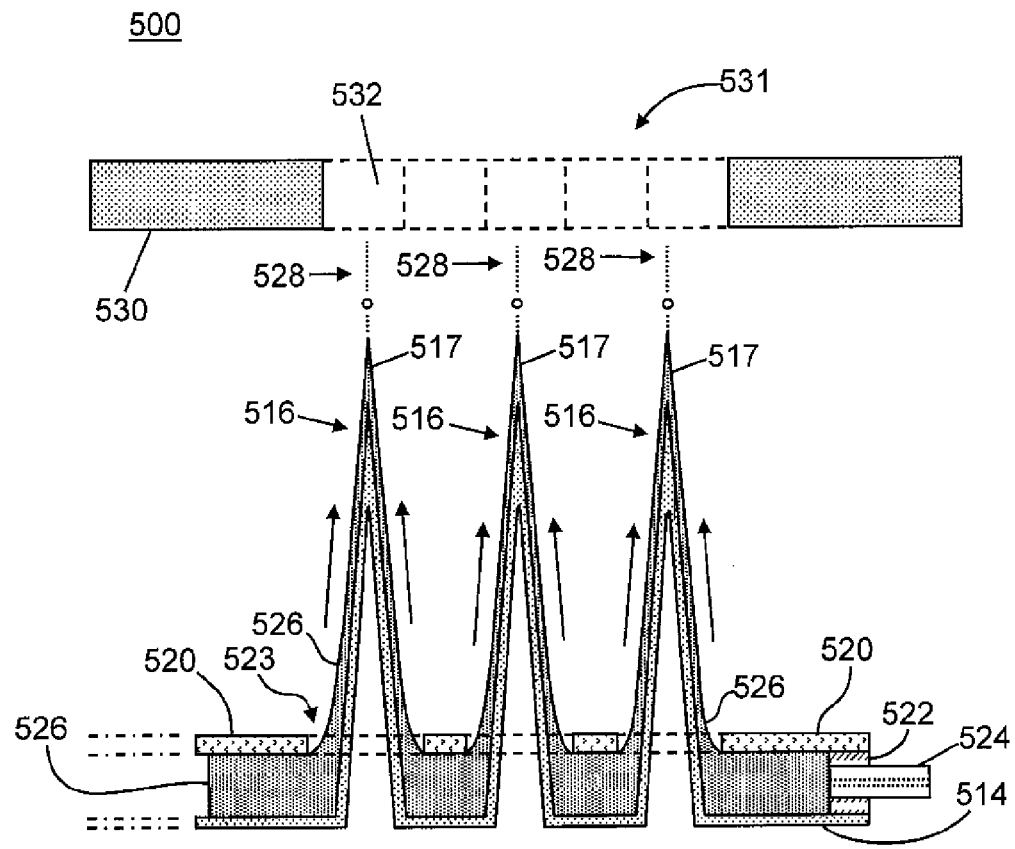
FIG. 22A is a cross-sectional view of another nano-electrospray emitter array apparatus that may be fluidically coupled to an ion transfer tube in accordance with the present teachings.
Figure 22B:
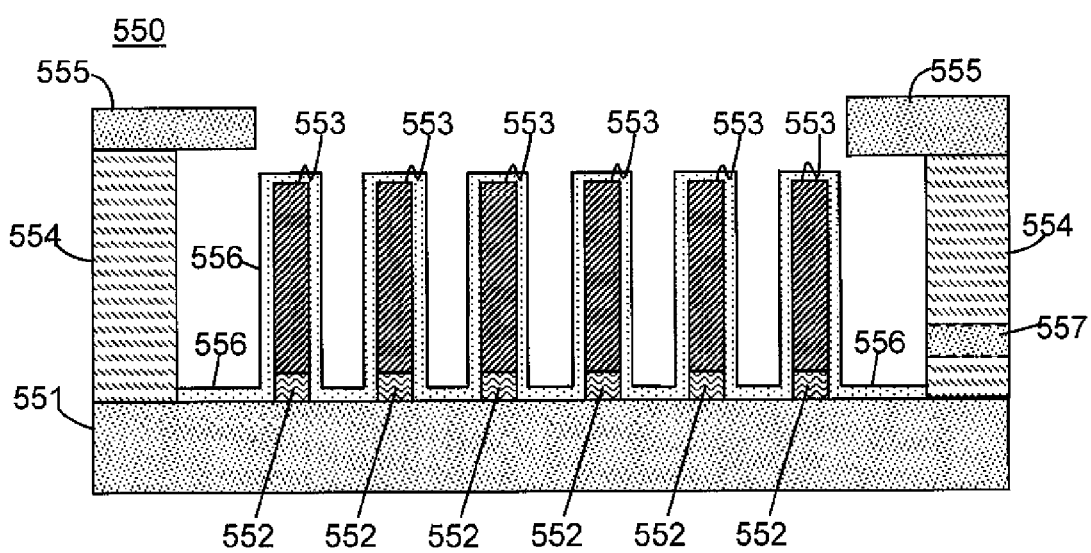
FIG. 22B is a cross-sectional view of another nano-electrospray emitter array apparatus that may be fluidically coupled to an ion transfer tube in accordance with the present teachings.

Alternatively, various types of ion emitters or nanospray ion emitters may provide ions to the ion capillary 160. FIGS. 19-21 provide various examples of electrospray emitters comprising nozzles configured such that sample-bearing charged droplets and ions are emitted from the nozzle interiors by means of apertures. FIGS. 22A-22B provide examples of pillared emitters configured such that charged droplets and ions are emitted from the pillar exterior surfaces.

Figure 19A:
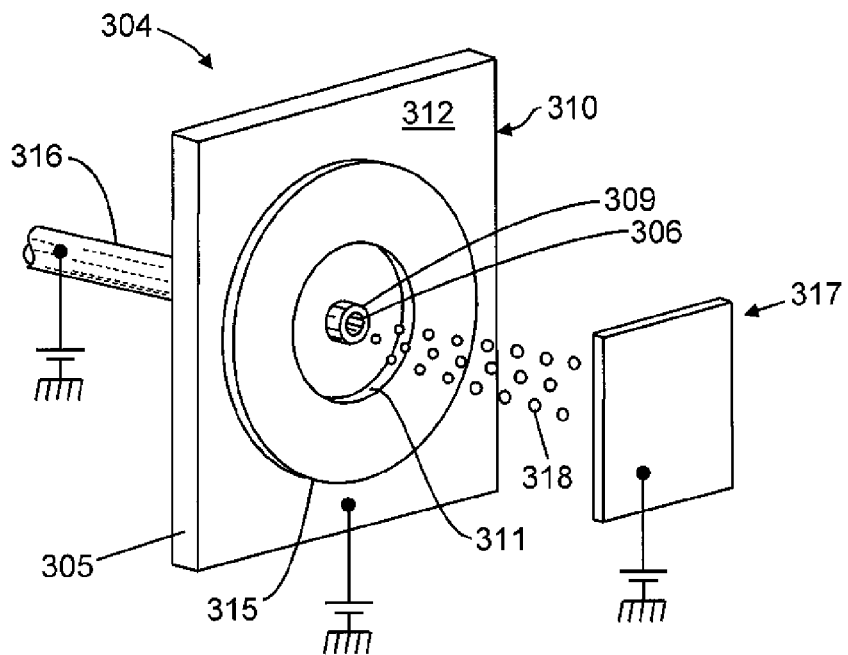
FIGS. 19A and 19B are, respectively, a perspective and a cross-sectional view of an example of a known nano-electrospray apparatus that may be configured as an emitter array that is fluidically coupled to an ion transfer tube in accordance with the present teachings.
Figure 19B:
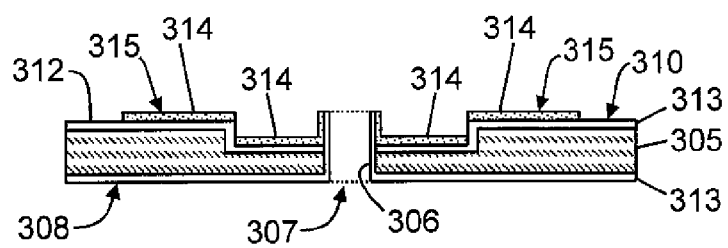

FIGS. 19A-19B show, respectively, a schematic view of one electrospray system and a cross-sectional view of an electrospray device of the system, as taught in United States Patent Application Publication 2002/0158027 A1, in the name of Moon et al., which is hereby incorporated by reference in its entirety. FIGS. 19A-19B illustrate a single emitter, which could be interfaced to the mass spectrometer system 250 (FIG. 17) as the sole emitter. Alternatively, an integrated array of emitters similar to the single electrospray emitter 304 could be fabricated and interfaced to the mass spectrometer system 250. The electrospray device 304 generally comprises a silicon substrate or microchip or wafer 305 defining a channel 306 through substrate 305 between an entrance orifice 307 on an injection surface 308 and a nozzle 309 on an ejection surface 310. The nozzle 309 has an inner and an outer diameter and is defined by a recessed region 311. The region 311 is recessed from the ejection surface 310, extends outwardly from the nozzle 309 and may be annular. The tip of the nozzle 309 does not extend beyond the ejection surface 310 to thereby protect the nozzle 309 from accidental breakage.

A grid-plane region 312 of the ejection surface 310 is exterior to the nozzle 309 and to the recessed region 311 and may provide a surface on which a layer of conductive material 314 including a conductive electrode 315 may be formed for the application of an electric potential to the substrate 305 to modify the electric field pattern between the ejection surface 310, including the nozzle tip 309, and the extracting electrode 317, which may simply be the ion transfer tube 160. Alternatively, the conductive electrode may be provided on the injection surface 308 (not shown).

The electrospray device 304 further comprises a layer of silicon dioxide 313 over the surfaces of the substrate 305 through which the electrode 315 is in contact with the substrate 305 either on the ejection surface 310 or on the injection surface 308. The silicon dioxide 313 formed on the walls of the channel 306 electrically isolates a fluid therein from the silicon substrate 305 and thus allows for the independent application and sustenance of different electrical potentials to the fluid in the channel 306 and to the silicon substrate 305. Alternatively, the substrate 305 can be controlled to the same electrical potential as the fluid.

As shown in FIGS. 19A-19B, to generate an electrospray, fluid may be delivered to the entrance orifice 307 of the electrospray device 304 by, for example, a capillary 316 or micropipette. The fluid is subjected to a potential voltage $V_{fluid}$ via a wire (not shown) positioned in the capillary 316 or in the channel 306 or via an electrode (not shown) provided on the injection surface 308 and isolated from the surrounding surface region and the substrate 305. A potential voltage $V_{substrate}$ may also be applied to the electrode 315 on the grid-plane 312, the magnitude of which is preferably adjustable for optimization of the electrospray characteristics. The fluid flows through the channel 306 and exits or is ejected from the nozzle 309 in the form of very fine, highly charged fluidic droplets 318. The extracting electrode 317 may be held at a potential voltage $V_{extract}$ such that the electrospray is drawn toward the extracting electrode 317 under the influence of an electric field.

As another example, FIG. 20 illustrates an exemplary microfluidic device 400 as described in United States Patent Application Publication 2006/0103051 A1 in the name of Staats, which is hereby incorporated by reference in its entirety. The microfluidic device 400 has a substrate body 420 that is formed of a polymeric material and that has at least one microfluidic channel 430 that is formed in the substrate body 420. The microfluidic channels 430 can be arranged according to any number of different patterns. More specifically, the substrate body 420 has a first surface 422 and an opposing second surface 424 with the microfluidic channels 430 being formed between the first and second surfaces 422, 424 such that the microfluidic channels 430 extends the complete thickness of the substrate body 420. The microfluidic channels 430 are thus open at both a first end 432 at the first surface 422 and a second end 434 at the second surface 424. The first end 432 of the microfluidic channel 430 is in the form of a reservoir 460 (i.e., an annular cavity) that tapers inwardly to an intermediate channel section 436. The second end 434 of the microfluidic channel 430 is formed in a protrusion 450 that is formed on the second surface 424 of the substrate body 420. The tapered protrusion 450 serves as a nozzle that delivers a sample (i.e., a liquid) that is loaded into the microfluidic device 400. Electrospray is achieved by subjecting the nozzle 450 to a voltage so that liquid and analytes emerge to a high electric field. For this particular application, the microfluidic device 400 includes a conductive region formed on at least a portion of the nozzle 450 and optionally, the conductive region can extend onto the second surface 424. Each of the conductive regions formed around the nozzles 450 is connected to one or more electrical contacts formed at one edge of the substrate body 420.

FIG. 21 illustrates another electrospray device as disclosed in co-pending U.S. patent application Ser. No. 12/701,011 filed on 5 Feb. 2010 titled "Multi-Needle Multi-Parallel Nanospray Ionization Source For Mass Spectrometry" and assigned to the assignee of the present application, the disclosure of said co-pending application hereby incorporated herein by reference in its entirety. The electrospray device 470 shown in FIG. 21 comprises a bulk substrate material 402, such as a polycarbonate material and a multi-pillared electrode 414 that comprises a layer that is bonded to a portion of both a first side 403$a$ of the substrate as well as to the interior walls of apertures 401 within the substrate 402. The portions of the electrode 414 that are bonded to the walls of the apertures 401 comprise hollow pillars or columns. One method of creating the apertures 401, as explained in U.S. patent application Ser. No. 12/701,011, is by chemical etching of latent ion tracks formed by exposing the substrate to a beam of accelerated heavy ions. The electrode 414 may then be formed in the configuration shown by a combination of thin film deposition and electroplating. The portions of the electrode that are bonded to the interior walls of the apertures 401 may extend to a second side 403$b$ of the substrate 402. The second side 403$b$ may be either cut, ground or polished so as to remove the tips of the pillars, thereby truncating the pillar ends so as to expose a plurality of emission apertures or nozzles 405. With the pillar tips removed in this fashion, the truncated hollow pillars of the multi-pillared electrode 414 may be used as capillaries or conduits, wherein analyte-bearing liquid flows through the conduits to the emission apertures 405 so as to be emitted therefrom under electrospray emission conditions that include application of a voltage to the electrode 414.

FIG. 22A illustrates another electrospray device as described in the aforementioned co-pending U.S. patent application Ser. No. 12/701,011. The apparatus 500 shown in FIG. 22A comprises a multi-pillared emitter electrode 514 and an extractor electrode 530. The multi-pillared emitter electrode 514 comprises a plurality of pillars 516 integrated with a plurality of base portions or inter-pillar portions and comprises an electrically conductive surface to which an electric potential (low kilovolt range) is applied. The exteriors of the pillars and a side of the base facing the pillars may comprise a single continuous surface and may be formed by a procedure similar to that described with respect to FIG. 21 but with the additional step of removal of the substrate material. The electric field is largest at the tips and the electromotive force there is large enough to overcome the surface tension such that small charged droplets will be emitted. Most of these droplets readily evaporate to produce ions (as well as, possibly, some residual droplets) that may be directed to a first vacuum stage of a mass spectrometer for analysis.

The extractor electrode 530 (also referred to as a counter electrode) comprises one or more apertures 531 through which charged particles emitted from a sample pass under the influence of an electrical potential applied between the multi-pillared emitter electrode 514 and the extractor electrode 530. Advantageously, the extractor electrode may comprise a novel ion transfer tube 160 as disclosed herein.

The apparatus 500 (FIG. 22A) may, optionally, further comprise a cover plate 520 that is disposed substantially perpendicular to the longitudinal axes of the pillars 516 and that is maintained at a distance from the base portions or inter-pillar portions of the multi-pillared emitter electrode 514 by means of one or more spacers 522. The size of the resulting gap between the base or interpillar portions and the cover plate 520 could be controlled to regulate a flow of analyte-bearing liquid 526 and prevent it from spilling out.

One or more fluid inlet conduits 524 such as capillary tubes may pass through the one or more spacers 522 so as to introduce analyte-bearing sample liquids into the gap or gaps between the base or inter-pillar portions of the multi-pillared emitter electrode 514 and the cover plate 520. The fluid inlet conduit or conduits 524 may serve, for instance, to couple the apparatus to a liquid chromatograph or a syringe pump so that eluent would flow into the gap and between the pillars 516 so as to be subsequently wicked towards the pillar tips.

As indicated by arrows in FIG. 22A, analyte-bearing liquid 526 that flows into the vicinity of an aperture 523 of the cover plate 520 is further drawn or otherwise caused to move along the outer surfaces of pillars 516 passing through the aperture under the influence of surface tension or hydrodynamic effects or electrostatic effects (or some combination of these). The cover plate may not be required at all when the total quantity of analyte-bearing liquid is sufficiently small—in such a situation, the liquid may be retained on and will flow on the multi-pillared electrode solely by surface tension or electrostatic forces, or both.

Generation of an electric field in the vicinity of the emitter electrode 514 by application of a voltage difference between the multi-pillared emitter electrode and the extractor electrode 530 produces a concentration of electric field lines at each pillar tip. With sufficient electric field strength, the analyte-bearing liquid 526 deforms into a Taylor cone 517 at each respective pillar tip and emits a charged stream 528, comprising a jet, a spray of charged liquid droplets and, ultimately, a cloud of free ions.

FIG. 22B illustrates an alternative electrospray apparatus as also described in the aforementioned co-pending U.S. patent application Ser. No. 12/701,011. The apparatus 550 schematically illustrated in FIG. 22B comprises a plurality of columns 553 comprising, for example, carbon nanotube (CNT) or other material. If the columns 553 comprise CNT material, the CNT columns 553 may be formed on catalyst dots 552 deposited on a suitable substrate 551, such as a silicon wafer, the substrate comprising a "floor" for the CNT columns 553. An optional coating 556, such as a thin film coating deposited by chemical vapor deposition, may be deposited on or applied to the substrate floor and the surfaces of the columns 553 so as to provide surfaces that are "wettable" by potential analyte-bearing liquids. An overhanging extractor electrode 555 may be spaced away from the substrate 551 on the same side of the substrate as the columns 553 by one or more sidewalls or spacers 554. At least one fluid inlet 557 in either the substrate 551 or a sidewall 554 is fluidically connected to a source of analyte-bearing liquid and is used to introduce such analyte-bearing liquid to the bases of the columns and the region of the floor (possibly coated) surrounding the columns.

In operation, the nano-electrospray apparatus 550 is utilized to introduce electrosprayed ions into the ion inlet orifice of a mass spectrometer similar to the situation illustrated in FIG. 22A. The overhanging extractor electrode 555 may be eliminated or replaced by an ion transfer tube as disclosed herein.

Improved ion transfer tubes for mass spectrometry have been disclosed. The discussion included in this application is intended to serve as a basic description. Although the present invention has been described in accordance with the various embodiments shown and described, one of ordinary skill in the art will readily recognize that there could be variations to the embodiments and those variations would be within the spirit and scope of the present invention. The reader should be aware that the specific discussion may not explicitly describe all embodiments possible; many alternatives are implicit. For instance, an ion transfer tube in accordance with the invention need not be limited to one of these listed exemplary embodiments. More generally, such an ion transfer tube may include any of the novel features taught herein, either singly or in combination or in combination with other features. Accordingly, many modifications may be made by one of ordinary skill in the art without departing from the spirit, scope and essence of the invention. Neither the description nor the terminology is intended to limit the scope of the invention. All patent application disclosures, patent application publications or other publications are hereby explicitly incorporated by reference herein as if fully set forth herein.

What is claimed is:

1. An ion transfer tube for a mass spectrometer comprising:
   a core member; and
   a first jacket tube member at least partially enclosing the core member and providing one or more channels therethrough.

2. An ion transfer as recited in claim 1, wherein the core member comprises a channel passing therethrough.

3. An ion transfer tube as recited in claim 1, wherein each of the channels is partially bounded by an inner surface of the first jacket tube member and partially bounded by an exterior surface of the core member.

4. An ion transfer tube as recited in claim 1, wherein the channel passing through the core member comprises multiple lobes.

5. An ion transfer tube as recited in claim 1, further comprising a second jacket tube member at least partially enclosing the first jacket tube member and providing one or more additional channels therethrough.

6. An ion transfer tube as recited in claim 5, wherein each of the additional channels is partially bounded by an inner surface of the second jacket tube member and partially bounded by an exterior surface of the first jacket tube member.

7. An ion transfer tube as recited in claim 1, wherein the core member comprises a solid rod.

8. An ion transfer tube as recited in claim 1, wherein, at an outlet end of the ion transfer tube, the first jacket tube member extends partially beyond an end of the core member.

9. An ion transfer tube as recited in claim 1, further comprising a second jacket tube member at least partially enclosing the first jacket tube member and providing one or more additional channels therethrough.

10. An ion transfer tube as recited in claim 1, wherein the channels converge towards one another at an outlet end of the ion transfer tube.

11. An ion transfer tube as recited in claim 10, wherein the converging channels merge into a single output channel at the outlet end of the ion transfer tube.

12. An ion transfer tube as recited in claim 11, wherein the single output channel is within the core member.

13. An ion transfer tube as recited in claim 12, wherein the single output channel comprises a nozzle.

14. An ion transfer tube as recited in claim 11, wherein the single output channel is within the jacket tube member.

15. An ion transfer tube as recited in claim 14, wherein the single output channel comprises a nozzle.

16. A method of forming an ion transfer tube, comprising the steps of:
providing a first jacket tube member having a length and an internal bore, the internal bore passing along the length and defining an interior surface of circular cross section;
removing at least one portion of the first jacket tube member adjacent to the interior surface so as to form at least one groove, channel, slot, recess or embayment of or in the interior surface; and
providing a core member within the bore of the jacket tube member such that remnant portions of the interior surface of circular cross section mate against portions of an exterior surface of the core member.

17. A method of forming an ion transfer tube as recited in claim 16, wherein the step of removing at least one portion of the jacket tube member is performed by means of wire electrical discharge machining.

18. A method of forming an ion transfer tube as recited in claim 16, wherein the step of providing a core member within the bore of the jacket tube member comprises providing a solid rod within the bore of the jacket tube member.

19. A method of forming an ion transfer tube as recited in claim 16, further comprising the steps of:
providing a second jacket tube member having a length either the same as or different from the length of the first jacket tube member and having an internal bore, the internal bore passing along the length of the second jacket tube member and defining an interior surface of the second jacket tube member of circular cross section;
removing at least one portion of the second jacket tube member adjacent to the surface of the second jacket tube member so as to form at least one groove, channel, slot, recess or embayment of or in the interior surface of the second jacket tube member; and
providing the first jacket tube member with the core member therein within the bore of the second jacket tube member such that remnant portions of the interior surface of the second jacket tube member of circular cross section mate against portions of an exterior surface of the first jacket tube member.

20. A method of forming an ion transfer tube as recited in claim 16, wherein the step of providing a core member within the bore of the jacket tube member comprises providing the core member within the bore of the jacket tube member such that, at a first end of the ion transfer tube, the jacket tube member extends partly beyond an end of the core member.

21. A method of forming an ion transfer tube as recited in claim 19, wherein the step of providing the first jacket tube member with the core member therein within the bore of the second jacket tube member comprises providing the first jacket tube member within the bore of the second jacket tube member such that, at a first end of the ion transfer tube, the second jacket tube member extends partly beyond an end of the first jacket tube member.

22. A method for analyzing a sample comprising the steps of:
generating ions from the sample within an ionization chamber at substantially atmospheric pressure;
entraining the ions in a background gas;
transferring the background gas and entrained ions to an evacuated chamber of a mass spectrometer system using an ion transfer tube comprising a core member and a first jacket tube member at least partially enclosing the core member and providing one or more channels therethrough; and
analyzing the ions using a mass analyzer of the mass spectrometer system.

23. A method for analyzing a sample as recited in claim 22, wherein said channels merge into a single output channel which opens into the evacuated chamber of the mass spectrometer system.

24. A method for analyzing a sample as recited in claim 23, wherein said merging is located upstream of the opening of the output channel into the evacuated chamber of the mass spectrometer system by a distance that is equal to or greater than a diameter of said output channel.

25. A method for analyzing a sample as recited in claim 23, wherein said output channel comprises a nozzle structure.

26. An ion transfer tube for a mass spectrometer comprising:
a tube member having an inlet end, an outlet end and a central axis; and
a bore extending through the tube member from the inlet end to the outlet end, the bore comprising a plurality of lobes that intersect along the central axis.

27. An ion transfer tube as recited in claim 26, wherein each lobe comprises a width, a height that is smaller than the width and rounded corners.

28. An ion transfer tube as recited in claim 26, wherein the multiple lobes consist of exactly three lobes.

29. An ion transfer tube as recited in claim 26, wherein the multiple lobes consist of exactly four lobes.

30. An ion transfer tube as recited in claim 26, wherein the multiple lobes consist of at least five lobes.

31. An ion transfer tube as recited in claim 26, wherein a dimension or a cross-sectional area of the bore decreases through the tube member from the inlet end to the outlet end.

32. An ion transfer tube for a mass spectrometer comprising:
a tube member having an inlet end, an outlet end and a central axis; and
a plurality of slots extending through the tube member from the inlet end to the outlet end, none of the slots intersecting the central axis.

33. An ion transfer tube as recited in claim 32, wherein at least one of the plurality of slots comprises a cross section that is arcuate in shape.

34. An ion transfer tube as recited in claim 32, wherein a dimension or a cross-sectional area at least one of the plurality of slots decreases through the tube member from the inlet end to the outlet end.

35. An ion transfer tube as recited in claim 32, wherein at least two of the plurality of slots converge towards one another in the direction from the inlet end to the outlet end.

36. A system for generating ions and transmitting the ions into an evacuated chamber of a mass spectrometer, said system comprising:
- a plurality of ion emitters; and
- an ion transfer tube receiving the ions emitted from the plurality of ion emitters, the ion transfer tube comprising:
  - a core member; and
  - a first jacket tube member at least partially enclosing the core member and providing one or more channels therethrough,
- wherein each of the plurality of ion emitters is associated with a respective one of the channels.

37. A system as recited in claim 36, wherein the channels converge towards one another at an outlet end of the ion transfer tube.

38. A system as recited in claim 37, wherein the converging channels merge into a single output channel which opens into the evacuated chamber of the mass spectrometer.

\* \* \* \* \*